US007157697B2

(12) United States Patent
Bateman et al.

(10) Patent No.: US 7,157,697 B2
(45) Date of Patent: *Jan. 2, 2007

(54) ION DETECTOR

(75) Inventors: Robert Harold Bateman, Knutsford (GB); Jeff Brown, Mottram-in-Longdendale Hyde Cheshire (GB); Daniel James Kenney, Davenham (GB)

(73) Assignee: Micromass UK Limited, Manchester (GB)

( * ) Notice: Subject to any disclaimer, the term of this patent is extended or adjusted under 35 U.S.C. 154(b) by 145 days.

This patent is subject to a terminal disclaimer.

(21) Appl. No.: 10/734,055

(22) Filed: Dec. 11, 2003

(65) Prior Publication Data

US 2004/0173742 A1 Sep. 9, 2004

Related U.S. Application Data

(60) Provisional application No. 60/433,023, filed on Dec. 13, 2002.

(30) Foreign Application Priority Data

Dec. 12, 2002 (GB) ................................ 0229001.3

(51) Int. Cl.
*B01D 59/44* (2006.01)
*H01J 49/00* (2006.01)

(52) U.S. Cl. ...................... 250/281; 250/287; 250/397

(58) Field of Classification Search ............... 250/287, 250/281, 310, 397; 313/105 CM, 103 CM
See application file for complete search history.

(56) References Cited

U.S. PATENT DOCUMENTS 4,322,629 A * 3/1982 Eloy et al. .................. 250/299
4,398,090 A * 8/1983 Eloy et al. .................. 250/299
4,728,790 A 3/1988 Plies
5,349,185 A * 9/1994 Mendenhall ................ 250/287
5,402,034 A * 3/1995 Blouch et al. ....... 313/103 CM
5,466,940 A * 11/1995 Litman et al. .............. 250/397
6,051,831 A * 4/2000 Koster ........................ 250/281
6,229,142 B1 * 5/2001 Bateman et al. ............ 250/287
6,614,019 B1 * 9/2003 Feller et al. ................ 250/287
6,828,729 B1 * 12/2004 Owens et al. ............... 250/287

FOREIGN PATENT DOCUMENTS

DE 693 28 818 T2 12/1993

(Continued)

OTHER PUBLICATIONS

Combined Search and Examination Report under Section 17 and 18(3), The Patent Office, dated Apr. 8, 2005.

(Continued)

*Primary Examiner*—Nikita Wells
*Assistant Examiner*—Johnnie L Smith, II
(74) *Attorney, Agent, or Firm*—Anthony J. Janiuk; Jamie H. Rose

(57) ABSTRACT

An ion detector for a mass spectrometer is disclosed comprising one or more microchannel plates and an anode arranged to receive electrons emitted from the one or more microchannel plates. The anode preferably has a smaller diameter than the microchannel plates and is preferably arranged at a distance of at least 15 mm from the microchannel plates. One or more focusing lenses may be provided intermediate the microchannel plates and the anode. The anode preferably comprises two portions separated by an electrically insulated layer.

92 Claims, 8 Drawing Sheets

FOREIGN PATENT DOCUMENTS

| | | | |
|---|---|---|---|
| DE | 695 25 106 | T2 | 6/1995 |
| EP | 0 193 311 | A2 | 9/1986 |
| EP | 2 259 183 | A | 3/1993 |
| EP | 0 602 983 | B1 | 6/2000 |
| EP | 0 854 495 | B1 | 9/2003 |
| SU | 1780128 | A | 12/1992 |
| WO | WO 01/93306 | | 12/2001 |

OTHER PUBLICATIONS

Office action issued by Deutsches Patent-und Markenamt (German patent and trademark office), dated Jun. 23, 2005, for German Application No. 103 57 489.0-54.

* cited by examiner

ION DETECTOR

CROSS REFERENCE TO RELATED APPLICATION

This application claims priority from U.S. Provisional Application 60/433,023, filed Dec. 13, 2002 and United Kingdom Patent Application 0229001.3, filed Dec. 12, 2002. The contents of these applications are incorporated herein by reference.

STATEMENT OF FEDERAL SPONSORED RESEARCH

N/A

FIELD OF INVENTION

The present invention relates to an ion detector for use in a mass spectrometer, a mass spectrometer, a method of detecting ions and a method of mass spectrometry.

BACKGROUND OF INVENTION

Commercial high performance Time of Flight mass spectrometers generally utilise ion detection systems comprising microchannel plates for pre-amplifying ion pulse signals. Microchannel plates generate multiple electrons in response to an ion striking the input surface of the microchannel plate. The electrons which are generated by the microchannel plate provide an amplified signal which may then be subsequently recorded using a fast Analogue to Digital Converter ("ADC") or a Time to Digital Converter ("TDC"). Ion detectors comprising two microchannel plates are advantageously used for amplification of ion pulse signals in Time of Flight mass spectrometers.

Microchannel plate ion detectors are particularly advantageous for use in Time of Flight mass spectrometers since they provide a high gain amplification. For example, a single ion striking the input surface of a microchannel plate ion detector will typically cause several million electrons to be emitted from the output surface of the microchannel plate which can then be recorded. Microchannel plate ion detectors also have a relatively fast response time. Typically, an ion striking the input surface of a microchannel plate ion detector will generate a pulse of electrons having a pulse width of the order of a few nanoseconds at half pulse height. A further advantage of microchannel plate ion detectors is that the input surface of the microchannel plate is relatively flat and hence ions travel a relatively constant distance to the microchannel plate. Therefore, any spread in the arrival times of the ions at the input surface of the microchannel plate(s) is effectively negligible.

Although conventional microchannel plate ion detectors have several advantages they also have several disadvantages. In particular, conventional microchannel plate ion detectors suffer from signal induced ringing noise and/or reduced bandwidth caused by impedance mismatching between the collection anode which collects electrons from the microchannel plate(s) and the 50 Ω input amplifier of the Analogue to Digital Converter or the Time to Digital Converter used as part of the acquisition electronics. Another disadvantage of conventional microchannel plate ion detectors results from the requirement that Time of Flight mass spectrometers are designed to mass analyse ions having relatively high kinetic energies, typically several keV. In order to achieve such relatively high ion kinetic energies the ions are normally accelerated through an electric field generated by a high voltage difference between the ion source and the field free drift tube of the Time of Flight mass analyser. The mass spectrometer may be configured, for example, such that the ion source is floated at a high voltage and the flight tube is grounded or vice versa. However, normally the input amplifier of an Analogue to Digital Converter or a Time to Digital Converter in the ion detector is required to be operated at ground potential. Therefore, in order to apply an appropriate bias voltage to accelerate the electrons from the microchannel plate(s) to the collection anode of the ion detector it may be necessary to capacitively decouple the collection anode from the input of the Analogue to Digital Converter or the Time to Digital Converter. However, conventional approaches to capacitively decoupling the collection anode from the Analogue to Digital Converter or the Time to Digital Converter cause impedance mismatching between the collection anode and the Analogue to Digital Converter or the Time to Digital Converter. A further disadvantage of conventional microchannel plate ion detectors is that the collection anode tends to capacitively pick up high frequency noise from nearby circuitry such as high voltage power supplies which are used to power the microchannel plate(s) or the collection anode.

The combined effects of signal induced ringing noise, reduced bandwidth and high frequency noise pick-up in conventional microchannel plate ion detectors are detrimental to the mass resolving power and detection limits of the overall Time of Flight mass spectrometer. A further disadvantage of conventional microchannel plate ion detectors is that signal saturation may result from electron depletion in the microchannel plate(s) immediately after a relatively large ion pulse has been detected. This signal saturation results in a reduction of gain of the ion detector immediately after detection of a relatively large ion pulse.

It is therefore further desired to provide an improved microchannel plate ion detector.

SUMMARY OF THE INVENTION

According to an aspect of the present invention there is provided an ion detector for use in a mass spectrometer, the ion detector comprising: one or more microchannel plates, wherein in use ions are received at an input surface of the one or more microchannel plates and electrons are released from an output surface of the one or more microchannel plates; and an anode having a surface upon which electrons are received in use; wherein the ion detector further comprises: one or more electrodes and/or one or more magnetic lenses which, in use, direct, guide or attract at least some of the electrons released from the output surface of the one or more microchannel plates onto the anode; and wherein the output surface of the one or more microchannel plates has a first area and the surface of the anode has a second area, wherein the second area is ≧5% of the first area.

The one or more electrodes and/or the one or more magnetic lenses may be arranged between the one or more microchannel plates and the anode. The one or more electrodes and/or the one or more magnetic lenses may alternatively/additionally be arranged so as to surround at least a portion of the anode.

The one or more magnetic lenses preferably comprise one or more electro-magnets and/or one or more permanent magnets.

The anode may be made from a non-magnetic material. However, more preferably, the anode may be made from a soft (low coercivity) magnetic material. A soft magnetic material may be considered to have a coercivity (Hc) less than about 1000 Amp/meter. According to another embodiment the anode may be made from a hard or permanent (high coercivity) magnetic material. A hard magnetic material may be considered to have a coercivity of at least 3000, 3500 or 4000 Amp/meter.

The second area of the anode is preferably 5–90% of the first area of the output surface of the one or more microchannel plates. For example, the second area may be ≦85%, ≦75%, ≦70%, ≦65%, ≦60%, ≦55%, ≦50%, ≦45%, ≦40%, ≦35%, ≦30%, ≦25%, ≦20%, ≦15% or ≦10% of the first area.

The second area may be ≧10%, ≧15%, ≧20%, ≧25%, ≧30%, ≧35%, ≧40%, ≧45%, ≧50%, ≧55%, ≧60%, ≧65%, ≧70%, ≧75%, ≧80% or ≧85% of the first area.

Preferably, the one or more electrodes comprise one or more ring lenses. The one or more electrodes may be relatively thin for example having a thickness of ≦1.5 mm, ≦1.0 mm or ≦0.5 mm.

Alternatively/additionally, the one or more electrodes may comprise one or more Einzel lens arrangements comprising three or more electrodes, one or more segmented rod sets, one or more tubular electrodes or one or more quadrupole rod sets. The one or more electrodes may comprise a plurality of electrodes having apertures through which electrons are transmitted in use, the apertures having substantially the same area. Alternatively, the one or more electrodes may comprise a plurality of electrodes having apertures through which electrons are transmitted in use, the apertures becoming progressively smaller or larger in a direction towards the anode.

According to another aspect of the present invention there is provided an ion detector for use in a mass spectrometer, the ion detector comprising: one or more microchannel plates, wherein in use ions are received at an input surface of the one or more microchannel plates and electrons are released from an output surface of the one or more microchannel plates; and an anode having a surface upon which electrons are received in use; wherein the ion detector further comprises: one or more electromagnets and/or one or more permanent magnets which, in use, direct or guide at least some of the electrons released from the output surface of the one or more microchannel plates onto the anode.

According to another aspect there is provided an ion detector for use in a mass spectrometer, the ion detector comprising: one or more microchannel plates, wherein in use ions are received at an input surface of the one or more microchannel plates and electrons are released from an output surface of the one or more microchannel plates; and an anode having a surface upon which electrons are received in use; wherein the ion detector further comprises: a plurality of electrodes and/or one or more magnetic lenses which, in use, direct, guide or attract at least some of the electrons released from the output surface of the one or more microchannel plates onto the anode, wherein the output surface of the one or more microchannel plates has a first area and the surface of the anode has a second area.

The anode may in one embodiment comprise a pin anode.

The output surface of the one or more microchannel plates is preferably maintained at a first potential, the surface of the anode is preferably maintained at a second potential and the one or more of the electrodes and/or the one or more magnetic lenses are preferably maintained at a third potential.

The second potential may be more positive than the first potential. For example, the potential difference between the surface of the anode and the output surface of the one or more microchannel plates may be 0–50 V, 50–100 V, 100–150 V, 150–200 V, 200–250 V, 250–300 V, 300–350 V, 350–400 V, 400–450 V, 450–500 V, 500–550 V, 550–600 V, 600–650 V, 650–700 V, 700–750 V, 750–800 V, 800–850 V, 850–900 V, 900–950 V, 950–1000 V, 1.0–1.5 kV, 1.5–2.0 kV, 2.0–2.5 kV, >2.5 kV or <10 kV.

The third potential may be substantially equal to the first and/or the second potential. Alternatively, the third potential may be more positive than the first and/or the second potential. For example, the potential difference between the third potential and the first and/or the second potential may be 0–50 V, 50–100 V, 100–150 V, 150–200 V, 200–250 V, 250–300 V, 300–350 V, 350–400 V, 400–450 V, 450–500 V, 500–550 V, 550–600 V, 600–650 V, 650–700 V, 700–750 V, 750–800 V, 800–850 V, 850–900 V, 900–950 V, 950–1000 V, 1.0–1.5 kV, 1.5–2.0 kV, 2.0–2.5 kV, >2.5 kV or <10 kV. According to another embodiment the third potential may be more negative than the first and/or the second potential. The third potential may in one embodiment be intermediate the first and second potentials.

The surface of the anode may be arranged a distance <5 mm, 5–10 mm, 10–15 mm, 15–20 mm, 20–25 mm, 25–30 mm, 30–35 mm, 35–40 mm, 40–45 mm, 45–50 mm, 50–55 mm, 55–60 mm, 60–65 mm, 65–70 mm, 70–75 mm or >75 mm from the output surface of the one or more microchannel plates.

According to another aspect of the present invention there is provided an ion detector for use in a mass spectrometer, the ion detector comprising: one or more microchannel plates, wherein in use ions are received at an input surface of the one or more microchannel plates and electrons are released from an output surface of the one or more microchannel plates; and an anode having a surface upon which electrons are received in use; wherein the surface of the anode is arranged a distance x mm from the output surface and wherein x is selected from the group consisting of: (i) 35–40 mm; (ii) 40–45 mm; (iii) 45–50 mm; (iv) 50–55 mm; (v) 55–60 mm; (vi) 60–65 mm; (vii) 65–70 mm; (viii) 70–75 mm; and (ix) >75 mm; and wherein the output surface has a first area and the surface of the anode has a second area.

According to another aspect of the present invention there is provided an ion detector for use in a mass spectrometer, the ion detector comprising: one or more microchannel plates, wherein in use ions are received at an input surface of the one or more microchannel plates and electrons are released from an output surface of the one or more microchannel plates, the output surface having a first area; and an anode having a surface upon which electrons are received in use, wherein the surface of the anode has a second area; wherein the second area is 5–25% of the first area.

According to another aspect of the present invention there is provided an ion detector for use in a mass spectrometer, the ion detector comprising: one or more microchannel plates, wherein in use ions are received at an input surface of the one or more microchannel plates and electrons are released from an output surface of the one or more microchannel plates, the output surface having a first area; and an anode having a surface upon which electrons are received in use, wherein the surface of the anode has a second area; wherein the second area is 30–90% of the first area.

According to the preferred embodiment electrons may be received across substantially the whole of the second area.

The anode preferably comprises a first portion, a second portion and an electrically insulating layer provided between the first and second portions, the first portion having a surface upon which electrons are received in use. The first portion may be maintained at a different DC potential to the second portion. Alternatively, the first portion may be maintained at substantially the same DC potential as the second portion.

The anode is preferably substantially conical. A substantially conical screen may surround at least a portion of the anode. The anode preferably has a capacitance of 0.01–0.1 pF, 0.1–1 pF, 1–10 pF or 10–100 pF. The surface of the anode upon which electrons are received in use is preferably substantially flat.

According to another aspect of the present invention there is provided a mass spectrometer comprising an ion detector as described above.

The mass spectrometer preferably comprises a Time of Flight mass analyser such as an axial or orthogonal acceleration Time of Flight mass analyser. The Time of Flight mass analyser may comprise a reflectron. The mass spectrometer may comprise an Analogue to Digital Converter ("ADC") or Time to Digital Converter ("TDC") connected to the ion detector.

The mass spectrometer may comprise an Atmospheric Pressure Chemical Ionisation ("APCI") ion source, an Atmospheric Pressure Photo Ionisation ("APPI") ion source, a Laser Desorption Ionisation ("LDI") ion source, an Inductively Coupled Plasma ("ICP") ion source, a Fast Atom Bombardment ("FAB") ion source, a Liquid Secondary Ions Mass Spectrometry ("LSIMS") ion source, a Field Ionisation ("FI") ion source, a Field Desorption ("FD") ion source, an Electron Impact ("EI") ion source or a Chemical Ionisation ("CI") ion source.

More preferably, the mass spectrometer may comprises a Matrix Assisted Laser Desorption Ionisation ("MALDI") or Electrospray ion source.

The ion source may be continuous or pulsed.

According to another aspect of the present invention there is provided a method of detecting ions comprising: receiving ions at an input surface of one or more microchannel plates; releasing electrons from an output surface of the one or more microchannel plates; and directing or guiding at least some of the electrons released from the one or more microchannel plates onto a surface of an anode by means of one or more electrodes and/or one or more magnetic lenses, wherein the area of the surface of the anode is ≧5% of the area of the output surface of the one or more microchannel plates.

According to another aspect of the present invention there is provided a method of detecting ions comprising: receiving ions at an input surface of one or more microchannel plates; releasing electrons from an output surface of the one or more microchannel plates; and directing or guiding at least some of the electrons released from the one or more microchannel plates onto a surface of an anode by means of one or more electro-magnets and/or one or more permanent magnets.

According to another aspect of the present invention there is provided a method of detecting ions comprising: receiving ions at an input surface of one or more microchannel plates; releasing electrons from an output surface of the one or more microchannel plates; directing or guiding at least some of the electrons released from the one or more microchannel plates onto a surface of an anode by means of a plurality of electrodes and/or one or more magnetic lenses.

According to another aspect of the present invention there is provided a method of detecting ions comprising: receiving ions at an input surface of one or more microchannel plates; releasing electrons from an output surface of the one or more microchannel plates; and directing at least some of the electrons released from the one or more microchannel plates onto a surface of an anode, wherein the surface of the anode is arranged a distance x mm from the output surface and wherein x is selected from the group consisting of: (i) 35–40 mm; (ii) 40–45 mm; (iii) 45–50 mm; (iv) 50–55 mm; (v)55–60 mm; (vi) 60–65 mm; (vii) 65–70 mm; (viii) 70–75 mm; and (ix) >75 mm.

According to another aspect of the present invention there is provided a method of detecting ions comprising: receiving ions at an input surface of one or more microchannel plates; releasing electrons from an output surface of the one or more microchannel plates; and directing at least some of the electrons released from the one or more microchannel plates onto a surface of an anode, wherein the area of the surface of the anode is 5–25% of the area of the output surface of the one or more microchannel plates.

According to another aspect of the present invention there is provided a method of detecting ions comprising: receiving ions at an input surface of one or more microchannel plates; releasing electrons from an output surface of the one or more microchannel plates; and directing at least some of the electrons released from the one or more microchannel plates onto a surface of an anode, wherein the area of the surface of the anode is 30–90% of the area of the output surface of the one or more microchannel plates.

According to another aspect of the present invention there is provided a method of mass spectrometry comprising a method of detecting ions as described above.

According to another aspect of the present invention there is provided an ion detector for use in a mass spectrometer, the ion detector comprising: one or more microchannel plates, wherein in use ions are received at an input surface of the one or more microchannel plates and electrons are released from an output surface of the one or more microchannel plates, the output surface having a first area; and an anode having a surface upon which electrons are received in use, the surface having a second area; wherein the anode comprises a hard or permanent magnetic material so that at least some of the electrons released from the output surface of the one or more microchannel plates are directed or guided onto the anode.

The hard or permanent magnetic material preferably has a coercivity (Hc) of at least 3000, 3500 or 4000 Amp/meter.

The anode preferably generates a magnetic field and wherein at least some of the electrons released from the output surface of the one or more microchannel plates are subject to the Lorentz force due to the magnetic flux from the anode and follow a substantially curved trajectory towards the anode with axial and angular components relative to the direction of the magnetic flux. Alternatively, it may be considered that the anode generates a magnetic field wherein at least some of the electrons released from the output surface of the one or more microchannel plates spiral around lines of magnetic field towards the anode.

At least 50%, 60%, 70%, 80%, 90% or 95% of the electrons released from the output surface of the one or more microchannel plates preferably have an energy of ≦500 eV, ≦450 eV, ≦400 eV, ≦350 eV, ≦300 eV, ≦250 eV, ≦200 eV, ≦150 eV, ≦100 eV or ≦50 eV. At least 50%, 60%, 70%, 80%, 90% or 95% of the electrons released from the output surface of the one or more microchannel plates preferably have an energy of ≧1 eV, ≧2 eV, ≧5 eV, ≧10 eV, ≧20 eV or ≧50 eV.

The potential difference between the surface of the anode and the output surface of the one or more microchannel plates is preferably 0–1 V, 1–5 V, 5–10 V, 10–15 V, 15–20 V, 20–25 V, 25–30 V, 30–50 V, 50–100 V, >100 V or <100 V.

According to another aspect of the present invention there is provided a method of detecting ions comprising: receiving ions at an input surface of the one or more microchannel plates; releasing electrons from an output surface of the one or more microchannel plates; and directing or guiding at least some of the electrons released from the one or more microchannel plates onto a surface of an anode, the anode comprising a hard or permanent magnetic material.

According to another aspect of the present invention there is provided a method of mass spectrometry comprising a method of detecting ions as described above.

The ion detector according to the preferred embodiment is capable of detecting either positive or negative ions. The preferred ion detector may be incorporated into a Time of Flight mass spectrometer comprising an ion source and a field free flight tube operated at a high voltage. The preferred ion detector comprises a collection anode which has a reduced capacitance and which is preferably capacitively decoupled from the microchannel plate(s). The preferred ion detector may also comprise a lens system arranged between the microchannel plate(s) and the collection anode for focusing and screening electrons which leave the output surface of the microchannel plate(s).

The preferred embodiment relates to a microchannel plate ion detector assembly which is capable of detecting either positive or negative ions without imposing limitations on the voltages which are applied to various components of the Time of Flight mass spectrometer upstream of the ion detector. The preferred ion detector also preferably has a relatively large bandwidth, reduced ringing noise and exhibits reduced capacitative pick-up of high frequency electronic noise.

The frequency of ringing noise observed using a microchannel plate ion detector may be approximated by:

$$f = \frac{1}{2\pi\sqrt{LC}}$$

where f is the ringing noise frequency in Hertz, L is the stray inductance in the collection anode circuitry in Henrys and C is the capacitance between the microchannel plate and the collection anode in Farads.

The ringing noise frequency f increases as the capacitance C between the microchannel plate and collection anode decreases. Provided that the ringing noise frequency is high enough, the analogue bandwidth (typically 500 MHz) of the amplifier in the Time to Digital Converter or the Analogue to Digital Converter will significantly attenuate the intensity of the ringing noise. Therefore, by decreasing the capacitance between the collection anode and the microchannel plate the ringing noise in the ion detector may be reduced.

In a conventional microchannel plate ion detector the microchannel plate(s) are circular and have the same diameter as a circular collection anode located behind the microchannel plate(s). The microchannel plate(s) are also positioned in relatively close proximity to the collection anode i.e. they are separated by about 5–10 mm. This conventional ion detector arrangement provides an assembly having a relatively high capacitance between the collection anode and microchannel plate(s).

It is known to make the collection anode conical in shape in an attempt to maintain the 50 Ω impedance matching between the collection anode and the coaxial amplifier cable leading to either the Time to Digital Converter or the Analogue to Digital Converter. In a conventional microchannel plate ion detector the capacitance $C_1$ between the collection anode and the microchannel plate(s) in Farads may be approximated as follows:

$$C_1 = \frac{\varepsilon\pi\left(\frac{D_1}{2}\right)^2}{G_1}$$

where $\epsilon$ is the permittivity of a vacuum ($8.854\times10^{-12}$ F/m), $D_1$ is the diameter of the surface of the circular collection anode and $G_1$ is the distance between the collection anode and the output surface of the rearmost circular microchannel plate(s).

In the preferred embodiment of the present invention the capacitance between the microchannel plate and collection anode is significantly reduced by increasing the distance between the microchannel plate(s) and the collection anode and/or decreasing the size of the surface of the collection anode. The capacitance $C_2$ between a circular collection anode and a circular microchannel plate(s) may be approximated as:

$$C_2 = \frac{\varepsilon\pi\left(\frac{D_2}{2}\right)^2}{G_2}$$

where $D_2$ is the diameter of the circular surface of the collection anode and $G_2$ is the distance between the collection anode and the output face of the microchannel plate(s).

The ratio of capacitance $C_2$ between the collection anode and microchannel plate(s) according to the preferred embodiment to the capacitance $C_1$ between the collection anode and microchannel plate(s) of a conventional ion detector is given by:

$$\frac{C_2}{C_1} = \frac{G_1}{G_2}\left(\frac{D_2}{D_1}\right)^2$$

For example, if a conventional ion detector has a distance $G_1$ of 5 mm between the collection anode and the microchannel plate(s) and the collection anode has a circular surface with a diameter $D_1$ of 50 mm then the capacitance between the collection anode and the microchannel plate(s) is 3.5 pF. However, if the diameter $D_2$ of the surface of the collection anode is reduced to 25 mm and the distance $G_2$ between the collection anode and microchannel plate(s) is also increased to 25 mm then the capacitance $C_2$ between the collection anode and microchannel plate(s) is significantly reduced to 0.17 pF. In this example the effect of reducing the size of the surface of the collection anode and of increasing the spacing between the collection anode and the microchannel plate(s) is to reduce the capacitance between the collection anode and the microchannel plate(s) by a factor of ×20. Accordingly, the ringing noise frequency f will increase by a factor of approximately ×4 and hence provided the ringing noise frequency is high enough the amplifier of the Analogue to Digital Converter or the Time to Digital Converter will significantly attenuate the ringing noise.

The reduction in capacitance between the preferred collection anode and the microchannel plate(s) also advantageously provides a significant reduction in the level of electronic noise pick-up and impedance mismatch between the collection anode and the co-axial cable leading to the Analogue to Digital Converter or to the Time to Digital Converter.

In the preferred embodiment the ion detector comprises one or more microchannel plates with the collection anode arranged downstream of the microchannel plate(s). The microchannel plate(s) receive ions at an input surface and generate electrons which are released from an output surface. The electrons emitted from the microchannel plates are collected by a collection anode.

A lens system may be arranged between the microchannel plate(s) and the collection anode. In one embodiment the lens system may direct or guide electrons from the output surface of the microchannel plate(s) to the input surface of the collection anode. This enables the voltage difference between the microchannel plate(s) and the collection anode to be reduced whilst still transferring the electrons from the microchannel plate(s) to the collection anode efficiently. The lens system also enables electrons to be directed or guided to the collection anode with negligible spreading in the electron flight times by the anode. The lens system also preferably reduces the detrimental effect of electric fields penetrating into the region between the microchannel plate (s) and collection electrode. This is a particular problem when a microchannel plate ion detector is used in a Time of Flight mass spectrometer wherein the flight tube of the Time of Flight mass spectrometer is floated at a relatively high voltage.

In another embodiment the lens system may be operated in a defocusing mode in order to control the overall gain of the ion detector or to blank out amplified signals which are likely to saturate a detection system which includes a Time to Digital Converter. The lens system may also be operated in a defocusing mode so that electrons that are released from certain areas of the microchannel plate are selectively directed or guided to the collection anode. For example, the lens system may guide electrons released from the centre of the microchannel plate to the collection anode whilst blocking electrons released from the periphery of the microchannel plate. This may be advantageous in that ions striking the centre of the input surface of the microchannel plate may generate pulses of electrons which are separated in time with a greater resolution compared with pulses of electrons generated in response to ions striking the periphery of the microchannel plate.

In one embodiment the lens system may comprise a plurality of ring lens elements. The ring lens elements are preferably conductive metal rings and preferably have relatively small surface areas so that any capacitive coupling between the microchannel plate(s) and the collection anode is minimised. The ring lens elements are preferably relatively thin (e.g. $\leqq 0.5$ mm) to help reduce capacitive coupling of high frequency noise onto the collection anode. The ring lens elements may also be connected to separate individual voltage supplies in order to reduce coupling between the individual ring lens elements and hence therefore between the microchannel plate(s) and the collection anode. Alternatively, the ring lens elements may be connected to a common voltage supply with each ring lens element being insulated from the other ring lens elements by high value resistors so that coupling between the ring lens elements is reduced.

According to an embodiment the collection anode is itself constructed as a capacitor in order to decouple the collection anode, which may be maintained at a relatively high voltage, from the Analogue to Digital Converter or from the Time to Digital Converter that records the signal generated by an ion arrival at the input surface of a double microchannel plate arrangement.

Various embodiments of the present invention together with other arrangements given for illustrative purposes only will now be described, by way of example only, and with reference to the accompanying drawings in which.

Figure 6A:
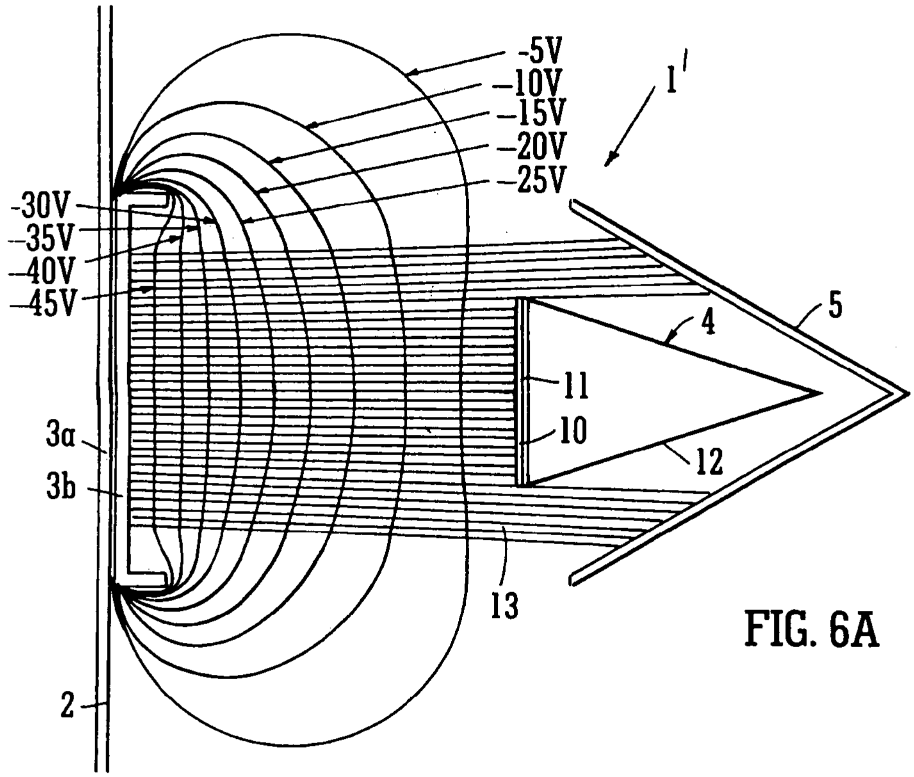
Figure 6B:
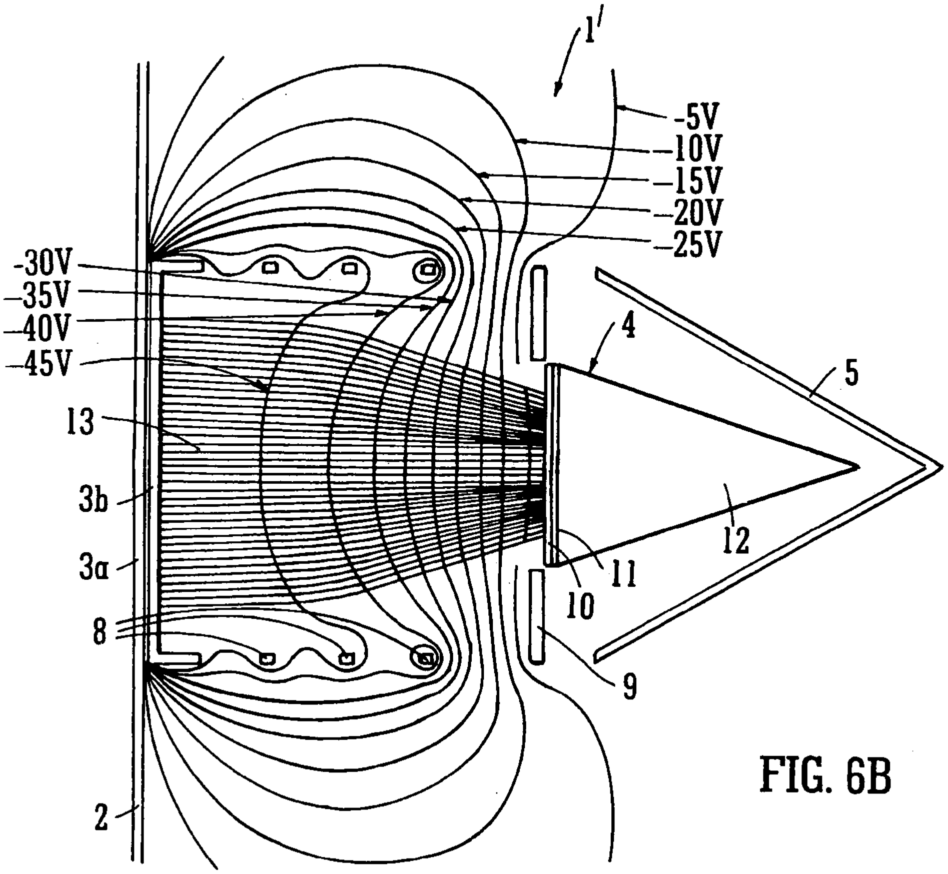
Figure 7A:
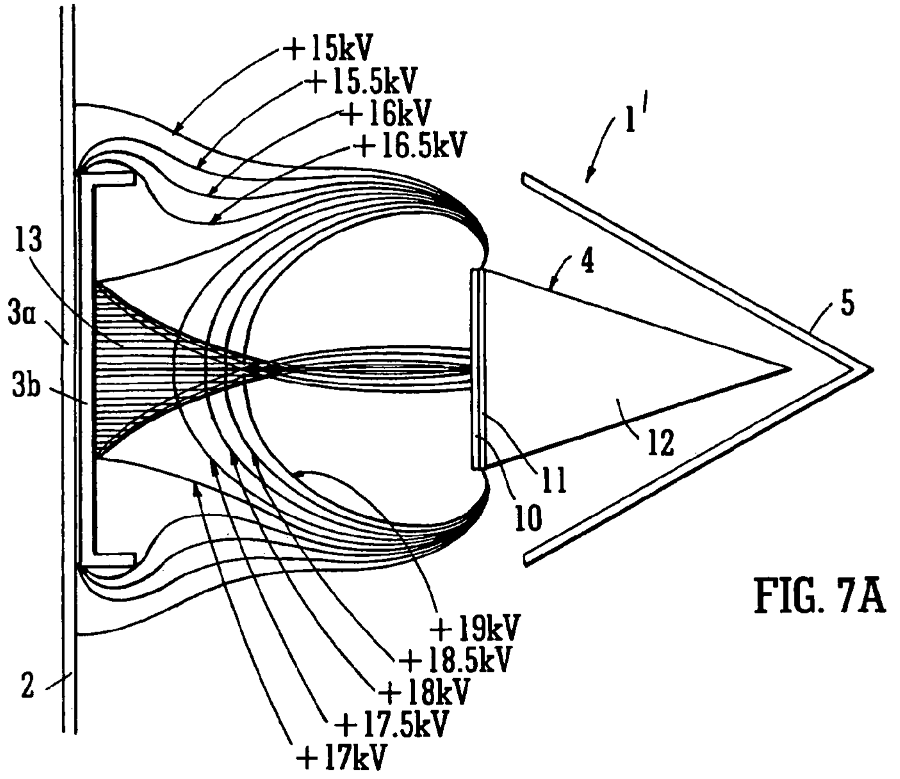
Figure 7B:
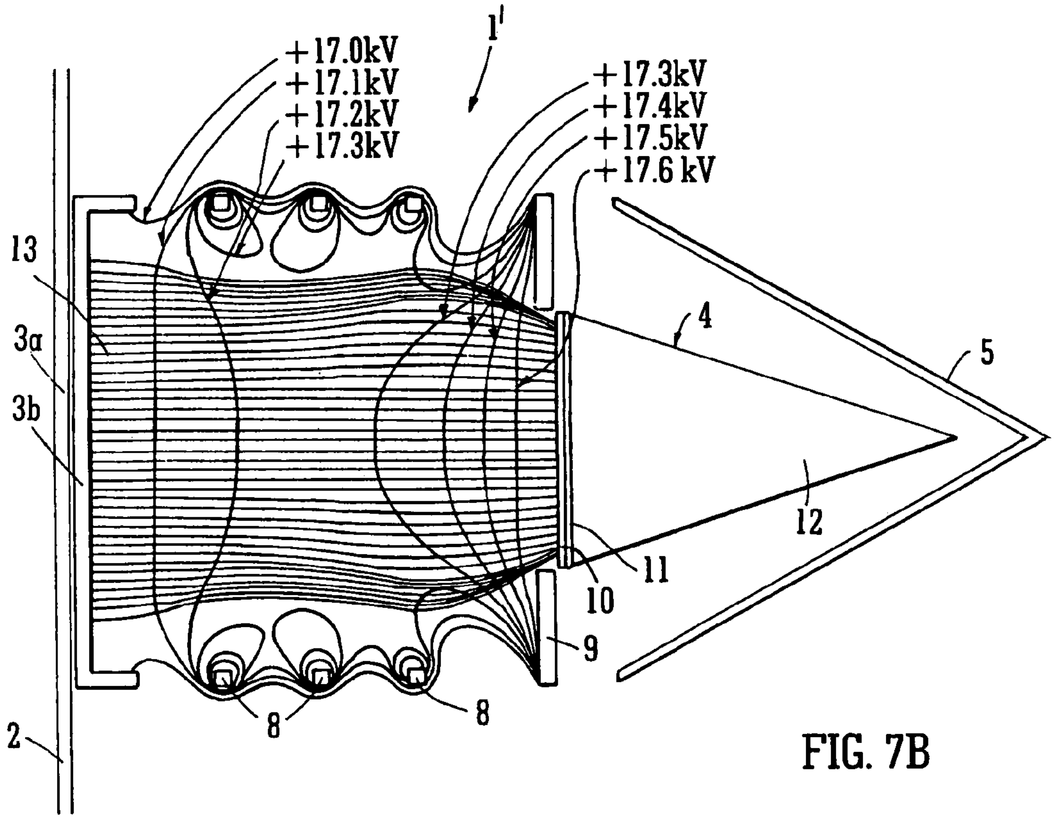
Figure 8A:
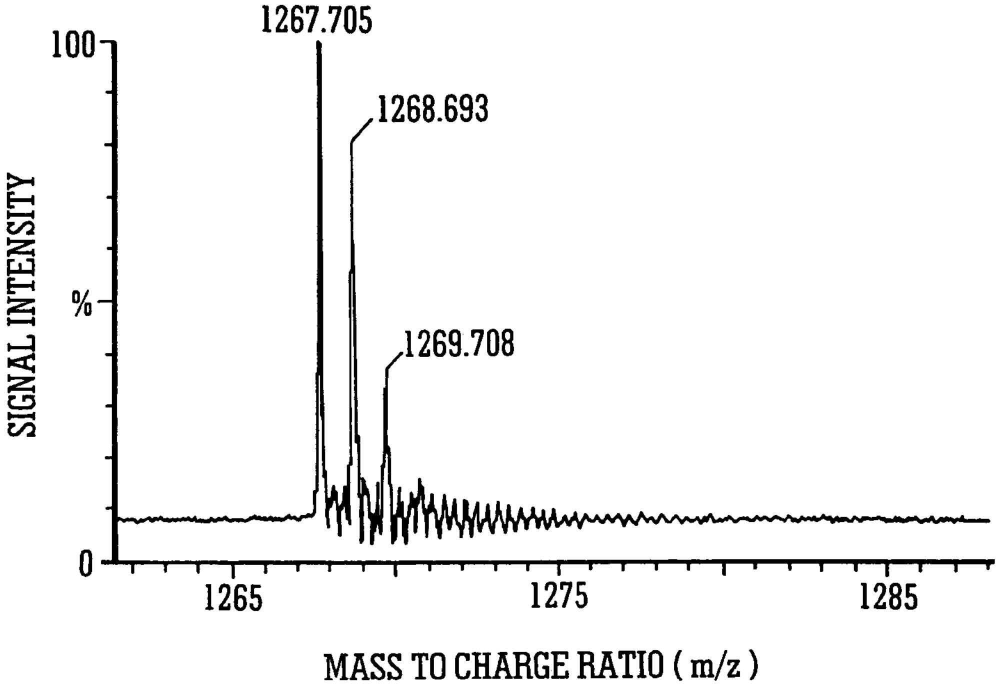
FIG. 8A PRIOR ART
Figure 8B:
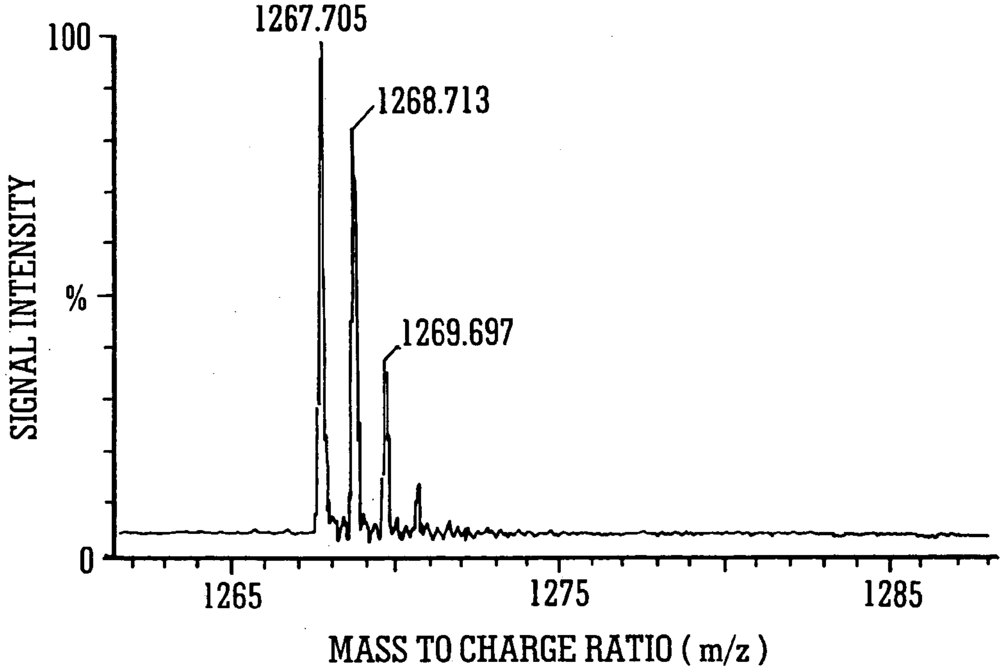
Figure 9:
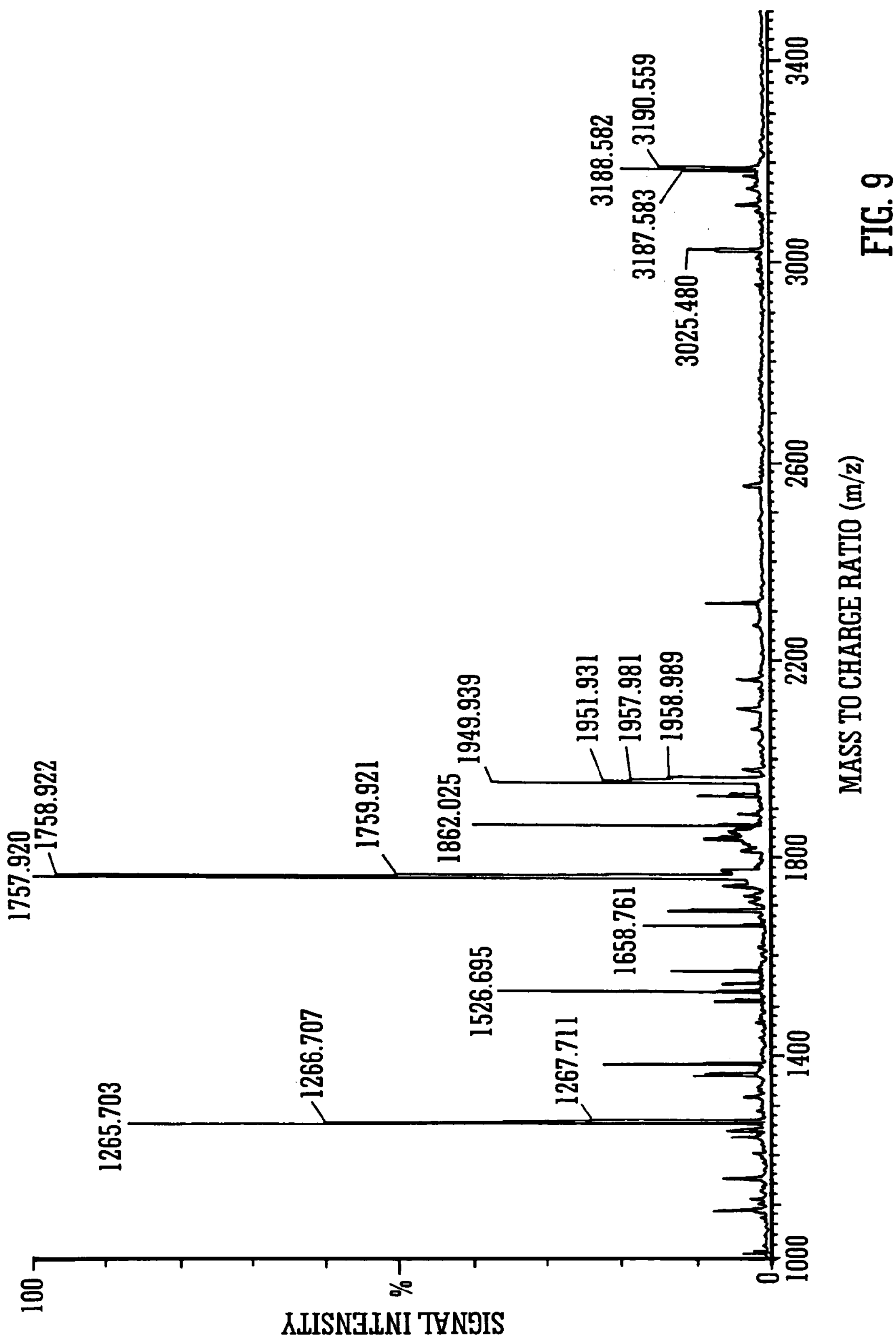
Figure 10:
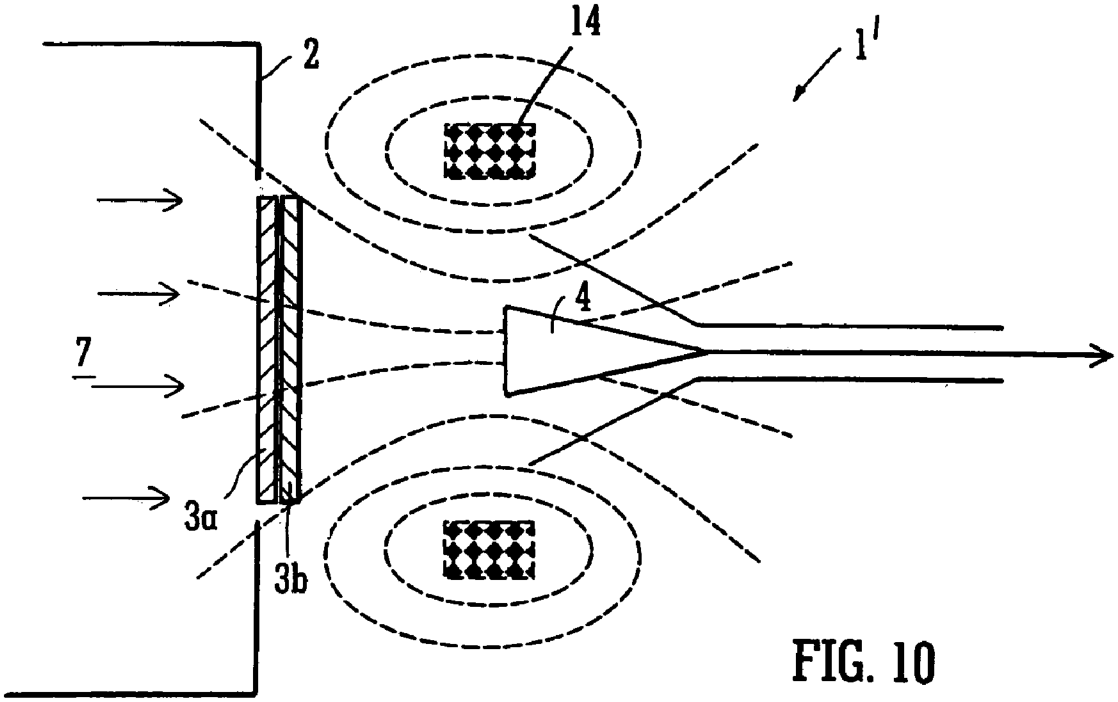
Figure 11:
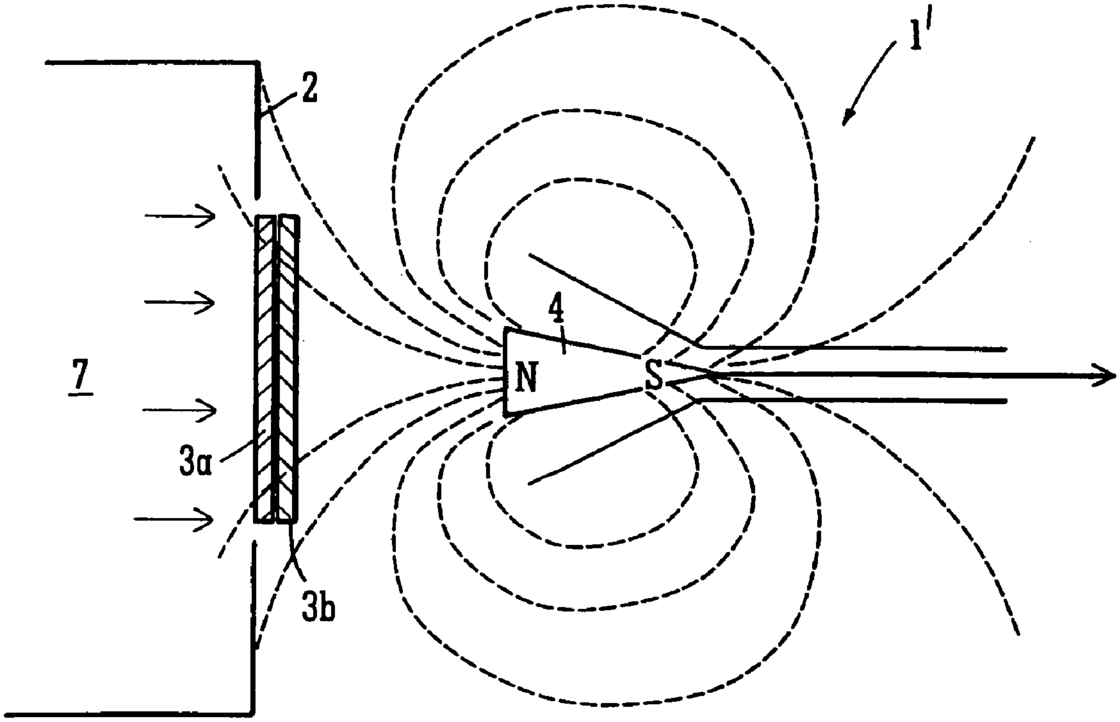

FIG. 6A shows a simulation of the electric potentials and electron trajectories according to a less preferred embodiment wherein a potential difference of −50 V is maintained between the rearmost microchannel plate and the collection anode and FIG. 6B shows a simulation of the electric potentials and electron trajectories according to a preferred embodiment wherein an intermediate focusing lens system is provided;

FIG. 7A shows a simulation of the electric potentials and electron trajectories according to a less preferred embodiment wherein a potential difference of 58 kV is maintained between the rearmost microchannel plate and the front portion of the collection anode and FIG. 7B shows a simulation of the electric potentials and electron trajectories according to a preferred embodiment wherein an intermediate lens system is provided and a potential difference of 750 V is maintained between the rearmost microchannel plate and the front portion of the collection anode;

FIG. 8A shows a mass spectrum obtained using a conventional ion detector and which suffers from ringing noise and FIG. 8B shows a comparable mass spectrum obtained using an ion detector according to the preferred embodiment which shows a significant reduction in ringing noise and which reveals the presence of a further mass peak which is not discernable from the conventional mass spectrum;

FIG. 9 shows a mass spectrum obtained using a preferred ion detector;

FIG. 10 shows an embodiment of an ion detector comprising a magnetic lens comprising an electro-magnet; and FIG. 11 shows an embodiment of an ion detector comprising a permanently magnetised anode.

DETAILED DESCRIPTION

Figure 1:
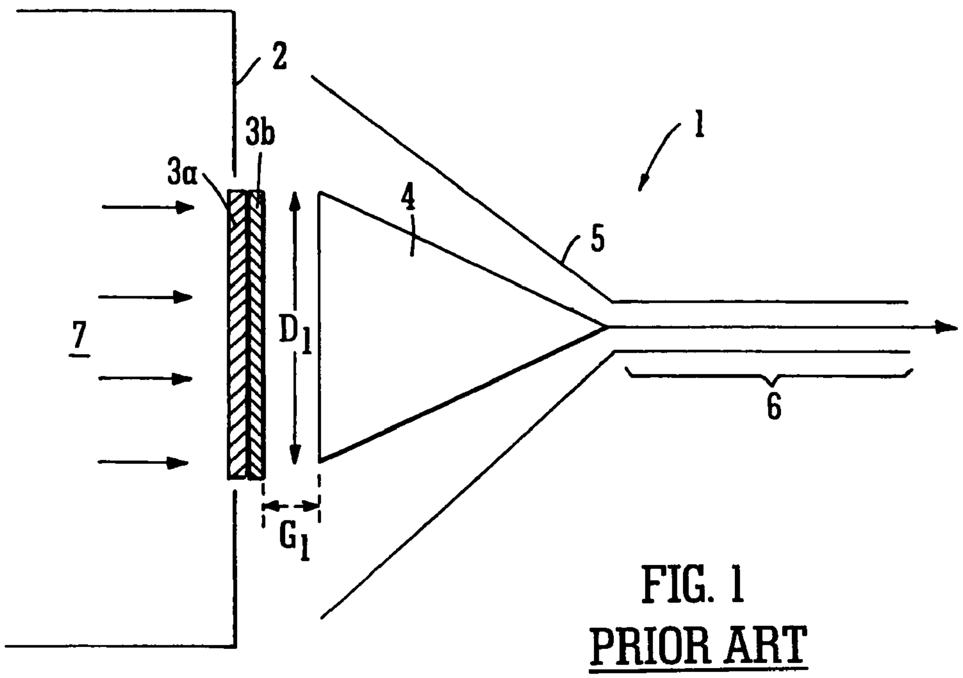
FIG. 1 PRIOR ART
FIG. 1 shows a conventional microchannel plate ion detector.

A conventional microchannel plate ion detector 1 is shown in FIG. 1 and comprises two microchannel plates 3*a*,3*b* arranged to receive ions 7 from a flight tube 2 of a Time of Flight mass analyser. The two microchannel plates 3*a*,3*b* are arranged in contact with each other and with the channels of the two microchannel plates being angled with respect to the interface between the microchannel plates 3*a*,3*b*. Ions 7 arriving at the ion detector 1 strike an input surface of the first microchannel plate 3*a* causing multiple electrons to be generated by the microchannel plate 3*a*. These electrons cause further cascading of electrons from the second microchannel plate 3*b*. The electrons generated by the microchannel plates 3*a*,3*b* then exit the rearmost microchannel plate 3*b* and are subsequently collected by a conical collection anode 4 arranged slightly downstream of (i.e. 5–10 mm from) the rearmost microchannel plate 3*b*. The output surface of the rearmost of the two microchannel plates 3*b* and the input surface of the collection anode 4 are circular and have substantially the same diameter $D_1$ and therefore have substantially the same area. The output surface of the rearmost of the microchannel plates 3*b* and the input surface of the collection anode 4 are positioned relatively close to one other at a distance $G_1$. The collection anode 4 is connected to a 50 Ω coaxial cable 6 which is connected to an Analogue to Digital Converter. A grounded conical screen 5 is provided radially outward from the collection anode 4.

Figure 2:
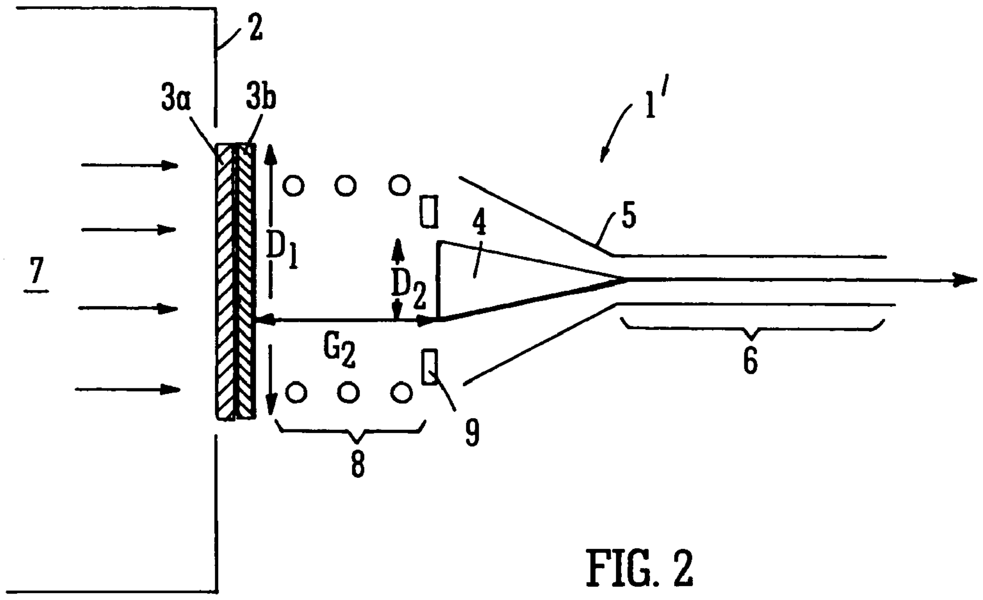
FIG. 2 shows a microchannel plate ion detector according to a preferred embodiment.

FIG. 2 shows an ion detector 1' according to a preferred embodiment of the present invention. The ion detector 1' comprises two microchannel plates 3*a*,3*b* arranged to receive ions 7 from, for example, the flight tube 2 of a Time of Flight mass analyser. The ion detector 1' comprises a collection anode 4 which is arranged downstream of the two microchannel plates 3*a*,3*b*. A lens system 8,9 is preferably provided between the two microchannel plates 3*a*,3*b* and the collection anode 4. The collection anode 4 may be connected, for example, to an Analogue to Digital Converter or to a Time to Digital Converter by a coaxial cable 6. The input surface of the collection anode 4 is preferably substantially smaller than the output surface of the rearmost of the microchannel plates 3*b*. The output surface of the rearmost microchannel plate 3*b* and the input surface of the collection anode 4 are both preferably circular having diameters of $D_1$ and $D_2$ respectively, wherein preferably $D_1 > D_2$.

The collection anode 4 is arranged at a distance $G_2$ which is preferably further away from the rearmost microchannel plate 3*b* than the corresponding anode 4 in a conventional ion detector 1 as can be seen by comparing FIGS. 1 and 2. The reduced surface area of the collection anode 4 according to the preferred embodiment and the increased distance $G_2$ of the collection anode 4 according to the preferred embodiment from the two microchannel plates 3*a*,3*b* significantly reduces the capacitance between the collection anode 4 and the two microchannel plates 3*a*,3*b*. This has the effect of increasing the frequency of ringing noise in the ion detector 1'. The size of the collection anode 4 and the distance $G_2$ of the anode 4 from the two microchannel plates 3*a*,3*b* is preferably selected so that the frequency of the ringing noise is high enough so that it is significantly attenuated by an amplifier either in an Analogue to Digital Converter or a Time to Digital Converter connected to the ion detector 1'.

As shown in FIG. 2, according to the preferred embodiment a lens system 8,9 is preferably arranged between the two microchannel plates 3*a*,3*b* and the collection anode 4. The lens system 8 may comprise a plurality of relatively thin conductive ring lens elements. The ring lens elements may be made from metal and are preferably maintained at appropriate voltages so that electrons are electrostatically guided from the output face of the two microchannel plates 3*a*,3*b* onto the input surface of the relatively small collection anode 4. The lens system 8,9 preferably reduces the potential difference which would otherwise be required to be maintained between the rearmost microchannel plate 3*b* and the collection anode 4 in order to transfer electrons efficiently from the microchannel plates 3*a*,3*b* to the collection anode 4. The particular voltages which are applied to the ring lens elements of the lens system 8,9 will preferably depend upon the voltages applied to other components of the Time of Flight mass analyser arranged upstream of the ion detector 1' and will also depend upon the polarity of the ions 7. The lens system 8,9 preferably also has the effect of reducing any electric field penetration into the region between the two microchannel plates 3*a*,3*b* and the collection anode 4 which would otherwise be detrimental to the efficient transferral of electrons from the microchannel plates 3*a*,3*b* to the collection anode 4. This is particularly advantageous when the ion detector forms part of a Time of Flight mass analyser and the two microchannel plates 3*a*,3*b* are floated at relatively high voltages.

The lens system 8,9 may also increase the energy of the electrons released from the rearmost microchannel plate 3*b* so that the electrons emitted from the microchannel plates 3*a*,3*b* travel to the collection anode 4 in a relatively short time. In this manner the lens system 8,9 preferably ensures that there is negligible spreading of the flight times of the electrons from the microchannel plates 3*a*,3*b* to the collection anode 4.

Each ring lens element of the lens system 8,9 is preferably relatively thin (e.g. approximately ≦0.5 mm) in order to reduce coupling of high frequency noise onto the collection anode 4. The rearmost ring lens element 9 located closest to the collection anode 4 is preferably constructed from an annular sheet having a thickness ≦0.5 mm and is preferably comprised of an electrical conductor having a central hole to allow electrons to pass through to the collection anode 4.

Figure 3:
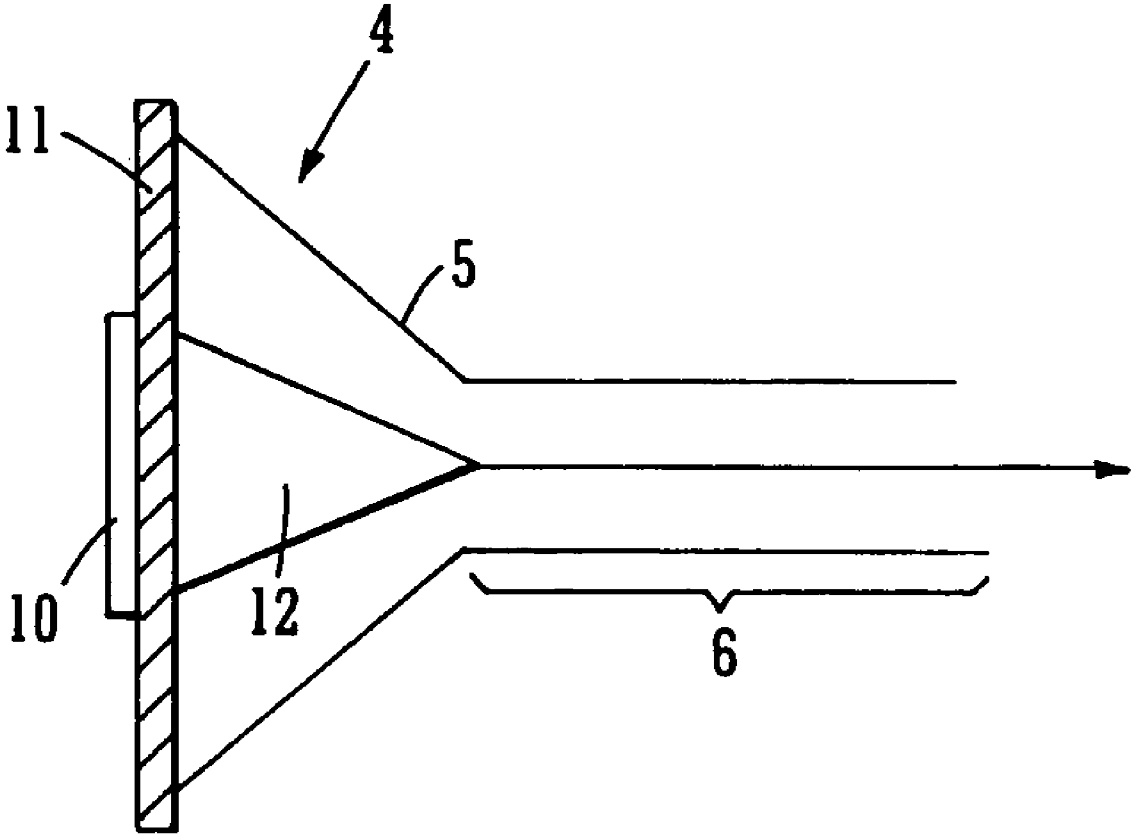
FIG. 3 shows a collection anode according to a preferred embodiment comprising two portions separated by an electrically insulating layer.

According to a particularly preferred embodiment the collection anode 4 may be constructed as a capacitor in order to decouple the collection anode 4, which may be maintained at a relatively high voltage, from an Analogue to Digital Converter or a Time to Digital Converter connected to the ion detector 1' and which records the signal generated by ions arriving at the input surface of the two microchannel plates 3*a*,3*b*. FIG. 3 shows a collection anode 4 which may be used in a preferred ion detector. The collection anode 4 is preferably constructed as a capacitor having a capacitance <100 pF by forming the collection anode 4 from two portions 10,12 separated by an electrically insulating layer 11.

The first portion 10 of the collection anode 4 is preferably capacitively decoupled from the second portion 12 of the collection anode 4 by the electrical insulating layer 11. The first 10 and second 12 portions of the collection anode 4 may therefore be maintained in use at different potentials. For example, the second portion 12 of the collection anode 4 which is connected to the recording device by a coaxial cable 6 is preferably grounded whilst the first portion 10 of the collection anode 4 may be maintained at a relatively high potential. Maintaining the second portion 12 of the collection electrode 4 at ground potential enables the output electronics to be simplified and also eliminates noise which would otherwise occur when connecting a voltage source to the output portion of the collection anode 4. The electrical insulator 11 which separates the first 10 and second 12 portions of the collection anode 4 may comprise a thin plastic sheet made, for example, from a material such as Kapton (RTM). The decoupling of the first portion 10 of the collection anode 4 from the second portion 12 and hence the recording device is particularly preferred in Time of Flight mass spectrometers wherein various components may be maintained at various voltages. For example, if an ion source producing negative ions were grounded and a field free flight tube were floated at a relatively high positive voltage then the electric field between the rearmost microchannel plate 3*b* and the input surface of the-grounded collection anode in a conventional ion detector would either be of incorrect polarity or would be insufficient in terms of magnitude in order to transfer the electrons efficiently from the microchannel plates 3*a*,3*b* to the collection anode 4. In the preferred embodiment the first portion 10 of the collection anode 4 is decoupled from the recording device so that the first portion 10 of the collection anode 4 may be maintained at a voltage which is such that electrons are transported efficiently from the rearmost microchannel plate 3*b* to the first portion 10 of the collection anode 4.

An advantage of the preferred embodiment is that both ringing noise and the pick-up of electronic noise is significantly reduced. Accordingly, relatively low abundance ion signals will no longer be masked by such noise. The gain of the two microchannel plates 3*a*,3*b* can therefore be set at a lower value than would otherwise be the case with conventional microchannel plate ion detectors. This is particularly advantageous in applications where the dynamic range of quantitation is limited by microchannel plate saturation effects which occur, for example, with higher abundance ion signals in Gas Chromatography Time of Flight mass spectrometers. Since the gain of the two microchannel plates preferably may be set relatively low, the number or rate at which ions arrive at the ion detector may advantageously be relatively high before saturation effects begin to occur.

FIGS. 4 to 7B show simulations of electron trajectories 13 between the microchannel plates 3*a*,3*b* and the collection anode 4 of both conventional ion detectors 1 and more and less preferred embodiments 1' of the present invention. The electron trajectories 13 were simulated using the SIMION charged particle ray tracing program. The electric potential contours are also shown on the simulations.

Figure 4:
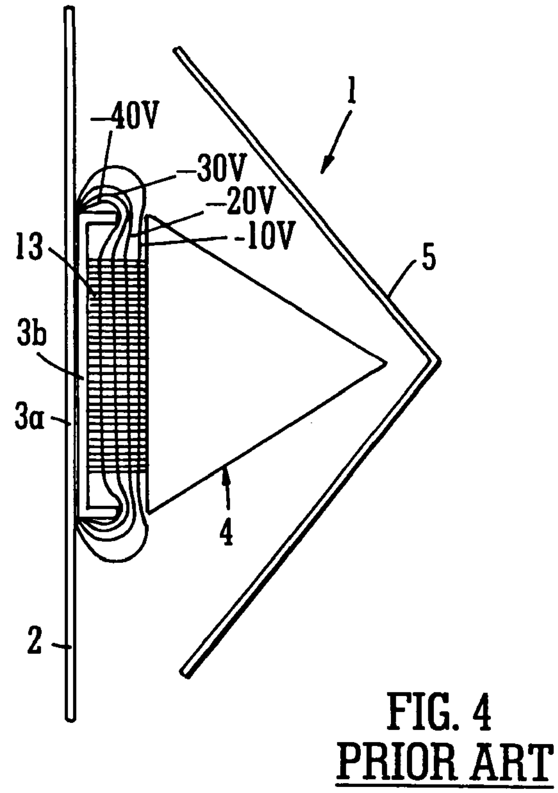
FIG. 4 PRIOR ART
FIG. 4 shows a simulation of the electric potentials and electron trajectories for a conventional ion detector.

FIG. 4 shows a simulation of the electric potentials and electron trajectories 13 in a conventional ion detector 1. A double microchannel plate arrangement 3*a*,3*b* is shown having a first microchannel plate 3*a* for receiving ions from a field free flight tube 2 of a Time of Flight mass analyser and a second microchannel plate 3*b* which emits electrons towards a collection anode 4. Positive or negative ions were assumed to be produced by an ion source maintained at positive or minus 15 kV respectively. The ions were therefore accelerated towards the field free flight tube 2 which was maintained at 0 V. The microchannel plates 3*a*,3*b* are shown having circular input and output surfaces of a diameter of 50 mm. The input surface and the output surface of the microchannel plates 3*a*,3*b* were maintained at −2 kV and −50 V respectively in this simulation. A collection anode 4 was modelled as being arranged 10 mm downstream of the output surface of the microchannel plates 3*a*,3*b* and which received electrons over a circular area also of 50 mm in diameter. The collection anode 4 was grounded. A grounded conical screen 5 was modelled as being provided radially outward of the collection anode 4. The collection anode 4 and conical screen 5 were connected to a coaxial cable which was connected to a recording device. Although electrons can be seen to be transferred efficiently from the rearmost microchannel plate 3*b* to the collection anode 4, because the collection anode 4 is relatively large and is arranged relatively close to the microchannel plates 3*a*,3*b* then there will be a relatively high level of capacitive coupling between the microchannel plates 3*a*,3*b* and the collection anode 4. This will result in a relatively high level of ringing noise in the ion detector 1.

Figure 5:
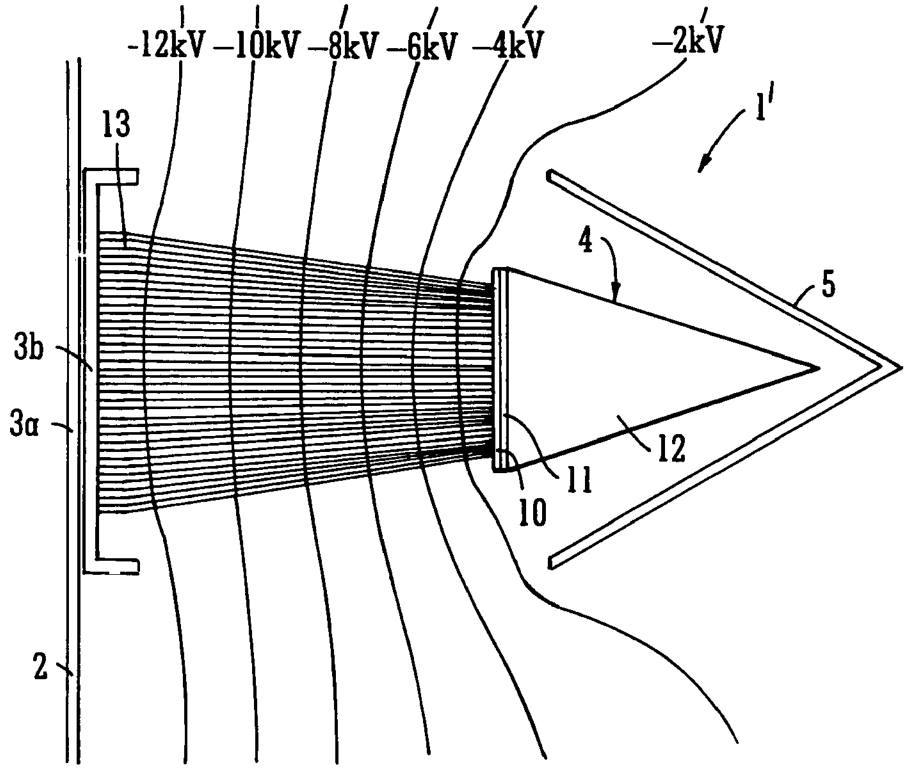
FIG. 5 shows a simulation of the electric potentials and electron trajectories according to a preferred embodiment wherein a potential difference of −13 kV is maintained between the rearmost microchannel plate and the collection anode.

FIG. 5 shows a simulation of the electric potentials and electron trajectories 13 in a less preferred ion detector 1' not having a lens system. Positive ions were modelled as being produced by an ion source maintained at 0 V. The positive ions were then accelerated towards the field free flight tube 2 of a Time of Flight mass spectrometer which was maintained at −15 kV. The microchannel plates 3*a*,3*b* had circular input and output surfaces of a diameter of 50 mm. The input surface and output surface of the microchannel plates 3*a*,3*b* were maintained at −15 kV and −13 kV respectively. A collection anode 4 was arranged 50 mm downstream (i.e. at a much greater separation than a conventional system) of the output surface of the rearmost microchannel plate 3*b*. The collection anode 4 comprised a first portion 10 separated from a second portion 12 by an insulating layer 11. The first portion 10 of the collection anode 4 received electrons over a circular reduced area of 25 mm in diameter. In this particular example the first portion 10 and the second portion 12 of the collection anode 4 were both maintained at 0 V. A grounded conical screen 5 was modelled as being provided radially outward of the collection anode 4. In this embodiment the relatively high potential difference (−13 kV) maintained between the rearmost microchannel plate 3*b* and the first portion 10 of the collection anode 4 enabled electrons to be transported efficiently from the rearmost microchannel plate 3*b* to the first portion 10 of the collection anode 4. Due to the relatively small and distant collection anode 4 the capacitance between the collection anode 4 and microchannel plates 3*a*,3*b* is significantly reduced. This will result in a corresponding reduction in the ringing noise detected by the ion detector 1' and will also reduce the impedance mismatching between the collection anode 4 and the recording device.

FIG. 6A shows a simulation of the electric potentials and electron trajectories 13 according to a less preferred embodiment. Positive or negative ions are modelled as being produced by an ion source maintained at positive or minus 15 kV respectively. The ions are accelerated towards the field free flight tube 2 of a Time of Flight mass spectrometer maintained at 0 V. The input and output surfaces of the microchannel plates 3*a*,3*b* are preferably circular and have a diameter of 50 mm. The input surface and output surface of the microchannel plates 3*a*,3*b* were modelled as being maintained at −2 kV and −50 V respectively. The collection anode 4 was modelled as being arranged 50 mm downstream of the output surface of the rearmost microchannel plate 3*b*. The collection anode 4 comprises a first portion 10 separated from a second portion 12 by an insulating layer 11. The first portion 10 of the collection anode 4 receives electrons over a reduced circular area of 25 mm in diameter. The first portion 10 and second portion 12 of the collection anode 4 were grounded. A grounded conical screen 5 was modelled as being provided radially outward of the collection anode 4. In this less preferred embodiment the collection anode 4 is relatively small and distant from the microchannel plates 3*a*,3*b* but only a relatively small potential difference (−50 V) is maintained between the rearmost microchannel plate 3*b* and the first portion 10 of the collection anode 4. Accordingly, a relatively large fraction of the electrons emitted from the microchannel plates 3*a*,3*b* are not accelerated onto the first portion 10 of the collection anode 4 and hence electrons are not transmitted efficiently from the microchannel plates 3*a*,3*b* to the collection anode 4.

FIG. 6B shows a simulation of the electric potentials and electron trajectories 13 according to a preferred embodiment. The ion detector 1' is substantially the same as the ion detector 1' shown in FIG. 6A except that an additional lens system 8,9 is provided between the microchannel plates 3*a*,3*b* and the collection anode 4. The lens system 8,9 preferably comprises three or more relatively thin ring lens elements which may, in one embodiment, be maintained at −50 V (i.e. the same potential as the rearmost microchannel plate 3*b*) and wherein the final annular ring lens element 9 is maintained at 0 V. In this embodiment the lens system 8,9 focuses the electrons emitted from the rearmost microchannel plate 3*b* onto the first portion 10 of the collection anode 4. The lens system 8,9 enables the capacitance and potential difference between the microchannel plates 3*a*,3*b* and the collection anode 4 to be reduced whilst maintaining efficient transportation of electrons from the microchannel plates 3*a*,3*b* to the collection anode 4.

FIG. 7A shows a simulation of the electric potentials and electron trajectories 13 according to a less preferred embodiment. Negative ions were modelled as being produced by an ion source maintained at 0 V. The ions were accelerated towards the field free flight tube 2 of a Time of Flight mass analyser which was maintained at 15 kV. The input and output surfaces of the microchannel plates 3*a*,3*b* were circular and had a diameter of 50 mm. The input surface and output surface of the microchannel plates 3*a*,3*b* were maintained at 15 kV and 17 kV respectively. The collection anode 4 was arranged 50 mm downstream of the output surface of the microchannel plates 3*a*,3*b*. The collection anode 4 preferably comprises a first portion 10 separated from a second portion 12 by an insulating layer 11. The first portion 10 of the collection anode 4 was maintained at 75 kV and had a circular surface area of 25 mm in diameter. The second portion 12 of the collection anode 4 was grounded. A grounded conical screen 5 was modelled as being provided radially outward of the collection anode 4. In this less preferred embodiment the electric field between the rearmost microchannel plate 3*b* (maintained at 17 kV), and the first portion 10 of the collection anode 4 (maintained at a higher positive potential of 75 kV) acts to accelerate electrons towards the collection anode 4. However, the electric field between the rearmost microchannel plate 3*b* and the second portion 12 of the collection anode 4 which is maintained at ground potential also acts to accelerate electrons back towards the rearmost microchannel plate 3*b*. In this simulation it can be seen that the electric field between the rearmost microchannel plate 3*b* and the second portion 12 of the collection anode 4 penetrates into the region between the rearmost microchannel plate 3*b* and first portion 10 of the collection anode 4. Accordingly, electrons released from the periphery of the rearmost microchannel plate 3*b* are accelerated back towards it and will not reach the collection anode 4. This can be seen from the simulation to occur even though the first portion 10 of the collection anode 4 is maintained at a potential 58 kV higher than the rearmost microchannel plate 3*b*. Furthermore, the electric field penetration into the region between the rearmost microchannel plate 3*b* and first portion 10 of the collection anode 4 causes those electrons which are nonetheless transmitted to the collection anode 4 to be focussed onto a relatively small area of the first portion 10 of the collection anode 4. This may result in saturation of the detection system.

FIG. 7B shows a simulation of the electric potentials and electron trajectories 13 according to a preferred embodiment. The first portion 10 of the collection anode 4 is maintained at 17.75 kV and advantageously an additional lens system 8,9 is arranged between the microchannel plates 3*a*,3*b* and the collection anode 4. The lens system 8,9 preferably comprises three thin ring lens elements and a further annular ring lens element 9. The ring lens elements 8,9 are all preferably maintained at 17.75 kV. In this embodiment the presence of the lens system 8,9 substantially prevents the electric field between the rearmost microchannel plate 3*b* (which is maintained at 17 kV) and the second portion 12 of the collection anode 4 (which is maintained at 0 V) from penetrating into the region between the rearmost microchannel plate 3*b* and the first portion 10 of the collection anode 4. Therefore, the electrons released from the periphery of the rearmost microchannel 3*b* plate are not accelerated back onto it and so substantially all of the electrons emitted from the rearmost microchannel plate 3*b* are focussed onto the relatively small and distant collection anode 4. Therefore, the potential difference between the rearmost microchannel plate 3*b* and first portion 10 of the collection anode 4 is significantly reduced whilst maintaining efficient electron transfer. In addition, the lens system 8,9 prevents the electrons from being focussed onto a relatively small area of the first portion 10 of the collection anode 4 and so the electrons preferably do not cause saturation of the detection system.

The ion detector 1' according to the preferred embodiment comprises a collection anode 4 which is relatively small and distant from the microchannel plates 3*a*,3*b*. The collection anode 4 is decoupled from the recording device and the use of a lens system 8,9 enables the preferred ion detector 1' to function with lower electronic and ringing noise and with a higher bandwidth than a conventional ion detector 1. The ion detector 1' according to the preferred embodiment is also capable of detecting either positive or negative ions in mass spectrometers having components upstream of the ion detector 1' which are maintained at various voltage configurations. Advantageously, the lens system 8,9 eliminates the need for an excessively high potential difference to be maintained between the microchannel plates 3*a*,3*b* and the collection anode 4 in order to transport the electrons efficiently.

The reduction in capacitive coupling between the collection anode 4 and the microchannel plates 3*a*,3*b* results in a significant reduction in the level of electronic noise pick-up and impedance mismatching between the collection anode 4 and the co-axial cable 6 leading to the Analogue to Digital Converter or the Time to Digital Converter.

FIGS. 8A and 8B illustrate the mass spectra obtained for isotopes of a peptide having a molecular weight of 2564.2 measured using both a conventional ion detector 1 and an ion detector 1' according to the preferred embodiment. FIG. 8A shows the signal intensity as a function of mass to charge ratio for the analysis of positive ions of a peptide from the tryptic digest of alpha-casein in the molecular ion region. The data was acquired using a conventional Matrix Assisted Laser Desorption Ionisation axial Time of Flight mass spectrometer comprising a reflectron ("MALDI-R"). The mass spectrometer comprised a microchannel plate ion detector where the input surface of the collection anode 4 was arranged 14 mm behind the output surface of the microchannel plate. The resulting mass spectrum can be seen to show three distinct mass peaks with a relatively large amount of ringing noise also being observed. FIG. 8B shows a corresponding mass spectrum obtained using an ion detector 1' according to the preferred embodiment wherein the input surface of the collection anode 4 was arranged 32 mm behind the output surface of the rearmost microchannel plate 3*b*. In this embodiment the capacitive coupling between the collection anode 4 and the microchannel plate 3*a*,3*b* was significantly reduced. Correspondingly, the ringing noise after the detection of the first mass peak was significantly attenuated and as such a fourth distinct mass peak was observed above the noise which was substantially observed in the mass spectrum shown in FIG. 8A which was obtained using a conventional ion detector 1.

FIG. 9 shows the signal intensity as a function of mass to charge ratio for the analysis of negative ions of a peptide from the tryptic digest of alpha-casein across the mass to charge ratio range of 1000–3500. The data was acquired using a Matrix Assisted Laser Desorption Ionisation Time of Flight mass spectrometer. The mass spectrometer comprised a preferred ion detector 1' similar to that illustrated in FIG. 7B.

FIG. 10 shows an embodiment comprising a dual microchannel plate assembly 3_a_,3_b_ and a lens comprising an electromagnet comprising a solenoid 14 wherein a portion of the anode 4 is placed within the solenoid 14. When the solenoid 14 is energised a magnetic field is generated as indicated by the dashed lines. The dashed lines indicate the magnetic field lines, and the magnetic field may be in either direction. Electrons released from the output face of the rearmost microchannel plate 3_b_ may be arranged to have relatively low energies, typically up to about 100 eV. Low energy electrons released from the output face of the microchannel plate 3_b_ will spiral about the lines of magnetic field. It can be seen from the figure that the lines of magnetic field become more concentrated in the centre of the solenoid 14, and so electrons from a broad area outside the solenoid 14 may be brought to a smaller area within the solenoid 14. A relatively small anode 4 may be placed within the solenoid 14 to collect the electrons. The anode 4 may be made of a non-magnetic conducting material. Alternatively, the anode 4 may be made of a soft magnetic material such as iron, mild steel, or various silicon-iron, nickel-iron or cobalt-iron alloys preferably having a relatively low coercivity less than 1000 Amp/meter. The soft magnetic material will further concentrate the magnetic field in the region of the anode 4.

FIG. 11 shows another embodiment comprising a dual microchannel plate assembly 3_a_,3_b_ and an anode 4 made from a permanent magnet which preferably has a relatively high coercivity of at least 3000, 3500 or 4000 Amp/meter. The figure shows the north pole of the magnetised anode 4 facing the microchannel plate assembly 3_a_,3_b_. Alternatively, the detector 1' may be arranged so as to have the south pole of the magnet facing the microchannel plate assembly 3_a_,3_b_. The dashed lines indicate the direction of the lines of the magnetic field. Electrons released from the output face of the rearmost microchannel plate 3_b_ are preferably arranged to have relatively low energies, typically up to about 100 eV. Low energy electrons released from the output face of the microchannel plate 3_b_ will preferably spiral about the lines of magnetic field. Since all the magnetic field lines pass through the permanently magnetised anode 4 then all the low energy electrons will be directed towards the magnetised anode 4. The anode 4 is preferably made of a hard or permanent (high coercivity) magnetic material such as carbon steel, cobalt steel, chrome steel and tungsten steel. Alternatively, the anode 4 may be made from various alloys, such as alloys of iron with aluminium, nickel and cobalt, or with aluminium, nickel, cobalt and copper. Alternatively, the anode 4 may be made from various rare earth element alloys, including rare earth element alloys with cobalt. For example, the anode 4 may be made of an alloy of cobalt and praseodymium, or an alloy of cobalt, cerium, copper and iron.

Further embodiments are contemplated wherein the anode 4 in the embodiment shown in FIG. 10 may also be permanently magnetised and one or more electrodes and/or further magnetic lenses may be provided to direct electrons on to the anode 4. Similarly, one or more electrodes and/or magnetic lenses may be provided to help direct electrons on to the permanently magnetised anode 4 in the embodiment shown in FIG. 11.

Whilst the various embodiments have been described in relation to using two microchannel plates 3_a_,3_b_ it is also contemplated that either a single or alternatively more than two microchannel plates may be provided. Similarly, it is also contemplated that the ion detector 1' may be incorporated in mass spectrometers other than Time of Flight mass spectrometers.

Although the present invention has been described with reference to preferred embodiments, it will be understood by those skilled in the art that various changes in form and detail may be made without departing from the scope of the invention as set forth in the accompanying claims.

The invention claimed is:

1. An ion detector for use in a mass spectrometer, said ion detector comprising:

one or more microchannel plates, wherein in use ions are received at an input surface of said one or more microchannel plates and electrons are released from an output surface of said one or more microchannel plates; and an anode having a surface upon which electrons are received in use;

wherein said ion detector further comprises:

one or more electrodes and/or one or more magnetic lenses which, in use, direct, guide or attract at least some of said electrons released from said output surface of said one or more microchannel plates onto said anode; and wherein said output surface of said one or more microchannel plates has a first area and said surface of said anode has a second area, wherein said second area is ≧5% of said first area.

2. An ion detector as claimed in claim 1, wherein said one or more electrodes and/or said one or more magnetic lenses are arranged between said one or more microchannel plates and said anode.

3. An ion detector as claimed in claim 1, wherein said one or more electrodes and/or said one or more magnetic lenses are arranged so as to surround at least a portion of said anode.

4. An ion detector as claimed in claim 1, wherein said one or more magnetic lenses comprises one or more electromagnets and/or one or more permanent magnets.

5. An ion detector as claimed in claim 1, wherein said anode is made from a non-magnetic material.

6. An ion detector as claimed in claim 1, wherein said anode is made from a soft (low coercivity) magnetic material.

7. An ion detector as claimed in claim 1, wherein said anode is made from a hard or permanent (high coercivity) magnetic material.

8. An ion detector as claimed in claim 1, wherein said second area is 5–90% of said first area.

9. An ion detector as claimed in claim 8, wherein said second area is ≦85%, ≦75%, ≦70%, ≦65%, ≦60%, ≦55%, ≦50%, ≦45%, ≦40%, ≦35%, or ≦30% of said first area.

10. An ion detector as claimed in claim 8, wherein said second area is ≦25%, ≦20%, ≦15%, or ≦10% of said first area.

11. An ion detector as claimed in claim 8, wherein said second area is ≧10%, ≧15%, ≧20%, or ≧25% of said first area.

12. An ion detector as claimed in claim 8, wherein said second area is ≧30%, ≧35%, ≧40%, ≧45%, ≧50%, ≧55%, ≧60%, ≧65%, ≧70%, ≧75%, ≧80% or ≧85% of said first area.

13. An ion detector as claimed in claim 1, wherein said one or more electrodes comprise one or more ring lenses.

14. An ion detector as claimed in claim 1, wherein said one or more electrodes have a thickness selected from the group consisting of: (i) ≦1.5 mm; (ii) ≦1.0 mm; and (iii) ≦0.5 mm.

15. An ion detector as claimed in claim 1, wherein said one or more electrodes comprise one or more Einzel lens arrangements comprising three or more electrodes.

16. An ion detector as claimed in claim 1, wherein said one or more electrodes comprise one or more segmented rod sets.

17. An ion detector as claimed in claim 1, wherein said one or more electrodes comprise one or more tubular electrodes.

18. An ion detector as claimed in claim 1, wherein said one or more electrodes comprise one or more quadrupole rod sets.

19. An ion detector as claimed in claim 1, wherein said one or more electrodes comprise a plurality of electrodes having apertures through which electrons are transmitted in use, said apertures having substantially the same area.

20. An ion detector as claimed in claim 1, wherein said one or more electrodes comprise a plurality of electrodes having apertures through which electrons are transmitted in use, said apertures becoming progressively smaller or larger in a direction towards said anode.

21. An ion detector for use in a mass spectrometer, said ion detector comprising:

one or more microchannel plates, wherein in use ions are received at an input surface of said one or more microchannel plates and electrons are released from an output surface of said one or more microchannel plates; and an anode having a surface upon which electrons are received in use;

wherein said ion detector further comprises:

one or more electro-magnets and/or one or more permanent magnets which, in use, direct or guide at least some of said electrons released from said output surface of said one or more microchannel plates onto said anode.

22. An ion detector for use in a mass spectrometer, said ion detector comprising:

one or more microchannel plates, wherein in use ions are received at an input surface of said one or more microchannel plates and electrons are released from an output surface of said one or more microchannel plates; and an anode having a surface upon which electrons are received in use;

wherein said ion detector further comprises:

a plurality of electrodes and/or one or more magnetic lenses which, in use, direct, guide or attract at least some of said electrons released from said output surface of said one or more microchannel plates onto said anode, wherein said output surface of said one or more microchannel plates has a first area and said surface of said anode has a second area.

23. An ion detector as claimed in claim 22, wherein said plurality of electrodes and/or said one or more magnetic lenses are arranged between said one or more microchannel plates and said anode.

24. An ion detector as claimed in claim 22, wherein said plurality of electrodes and/or said one or more magnetic lenses are arranged so as to surround at least a portion of said anode.

25. An ion detector as claimed in claim 22, wherein said one or more magnetic lenses comprises one or more electromagnets and/or one or more permanent magnets.

26. An ion detector as claimed in claim 22, wherein said anode is made from a non-magnetic material.

27. An ion detector as claimed in claim 22, wherein said anode is made from a soft (low coercivity) magnetic material.

28. An ion detector as claimed in claim 22, wherein said anode is made from a hard or permanent (high coercivity) magnetic material.

29. An ion detector as claimed in claim 22, wherein said second area is 5–90% of said first area.

30. An ion detector as claimed in claim 29, wherein said second area is ≦85%, ≦75%, ≦70%, ≦65%, ≦60%, ≦55%, ≦50%, ≦45%, ≦40%, ≦35% or ≦30% of said first area.

31. An ion detector as claimed in claim 29, wherein said second area is ≦25%, ≦20%, ≦15%, or ≦10% of said first area.

32. An ion detector as claimed in claim 29, wherein said second area is ≧10%, ≧15%, ≧20% or ≧25% of said first area.

33. An ion detector as claimed in claim 29, wherein said second area is ≧30%, ≧35%, ≧40%, ≧45%, ≧50%, ≧55%, ≧60%, ≧65%, ≧70%, ≧75%, ≧80% or ≧85% of said first area.

34. An ion detector as claimed in claim 22, wherein said anode comprises a pin anode.

35. An ion detector as claimed in claim 22, wherein said plurality electrodes comprises a plurality of ring lenses.

36. An ion detector as claimed in claim 22, wherein said plurality of electrodes each have a thickness selected from the group consisting of: (I) ≦1.5 mm; (ii) ≦1.0 mm; and (iii) ≦0.5 mm.

37. An ion detector as claimed in claim 22, wherein said plurality of electrodes comprise one or more Einzel lens arrangements comprising three or more electrodes.

38. An ion detector as claimed in claim 22, wherein said plurality of electrodes comprise one or more segmented rod sets.

39. An ion detector as claimed in claim 22, wherein said plurality of electrodes comprise a plurality of tubular electrodes.

40. An ion detector as claimed in claim 22, wherein said plurality of electrodes comprise one or more quadrupole rod sets.

41. An ion detector as claimed in claim 22, wherein said plurality of electrodes have apertures through which electrons are transmitted in use, said apertures having substantially the same area.

42. An ion detector as claimed in claim 22, wherein said plurality of electrodes have apertures through which electrons are transmitted in use, said apertures becoming progressively smaller or larger in a direction towards said anode.

43. An ion detector as claimed in claim 1, wherein in use said output surface of said one or more microchannel plates is maintained at a first potential, said surface of said anode is maintained at a second potential and said one or more of said electrodes and/or said one or more magnetic lenses are maintained at a third potential.

44. An ion detector as claimed in claim 43, wherein said second potential is more positive than said first potential.

45. An ion detector as claimed in claim 44, wherein the potential difference between said surface of said anode and said output surface of said one or more microchannel plates is selected from the group consisting of: (i) 0–50 V; (ii) 50–100 V; (iii) 100–150 V; (iv) 150–200 V; (v) 200–250 V; (vi) 250–300 V; (vii) 300–350 V; (viii) 350–400 V; (ix) 400–450 V; (x) 450–500 V; (xi) 500–550 V; (xii) 550–600 V; (xiii) 600–650 V; (xiv) 650–700 V; (xv) 700–750 V; (xvi) 750–800 V (xvii) 800–850 V; (xviii) 850–900 V; (xix) 900–950 V; (xx) 950–1000 V; (xxi) 1.0–1.5 kV; (xxii) 1.5–2.0 kV; (xxiii) 2.0–2.5 kV; (xxiv) >2.5 kV; and (xxv) <10 kV.

46. An ion detector as claimed in claim 43, wherein said third potential is substantially equal to said first and/or said second potential.

47. An ion detector as claimed in claim 43, wherein said third potential is more positive than said first and/or said second potential.

48. An ion detector as claimed in claim 47, wherein the potential difference between said third potential and said first and/or said second potential is selected from the group consisting of: (i) 0–50 V; (ii) 50–100 V; (iii) 100–150 V; (iv) 150–200 V; (v) 200–250 V; (vi) 250–300 V; (vii) 300–350 V; (viii) 350–400 V; (ix) 400–450 V; (x) 450–500 V; (xi) 500–550 V; (xii) 550–600 V; (xiii) 600–650 V; (xiv) 650–700 V; (xv) 700–750 V; (xvi) 750–800 V; (xvii) 800–850 V; (xviii) 850–900 V; (xix) 900–950 V; (xx) 950–1000 V; (xxi) 1.0–1.5 kV; (xxii) 1.5–2.0 kV; (xxiii) 2.0–2.5 kV; (xxiv) >2.5 kV; and (xxv) <10 kV.

49. An ion detector as claimed in claim 43, wherein said third potential is more negative than said first and/or said second potential.

50. An ion detector as claimed in claim 43, wherein said third potential is intermediate said first and second potentials.

51. An ion detector as claimed in claim 1, wherein said surface of said anode is arranged a distance x from the output surface of said one or more microchannel plates and wherein x is selected from the group consisting of: (i) <5 mm; (ii) 5–10 mm; (iii) 10–15 mm; (iv) 15–20 mm; (v) 20–25 mm; and (vi) 25–30 mm mm.

52. An ion detector as claimed in claim 1, wherein said surface of said anode is arranged a distance x from the output surface and wherein x is selected from the group consisting of: (i) 35–40 mm; (ii) 40–45 mm; (iii) 45–50 mm; (iv) 50–55 mm; (v) 55–60 mm; (vi) 60–65 mm; (vii) 65–70 mm; (viii) 70–75 mm; and (ix) >75 mm.

53. An ion detector for use in a mass spectrometer, said ion detector comprising:

one or more microchannel plates, wherein in use ions are received at an input surface of said one or more microchannel plates and electrons are released from an output surface of said one or more microchannel plates; and an anode having a surface upon which electrons are received in use;

wherein said surface of said anode is arranged a distance x mm from said output surface and wherein x is selected from the group consisting of: (i) 35–40 mm; (ii) 40–45 mm; (iii) 45–50 mm; (iv) 50–55 mm; (v) 55–60 mm; (vi) 60–65 mm; (vii) 65–70 mm; (viii) 70–75 mm; and (ix) >75 mm; and wherein said output surface has a first area and said surface of said anode has a second area.

54. An ion detector as claimed in claim 53, wherein said second area is 5–90% of said first area.

55. An ion detector as claimed in claim 54, wherein said second area is ≦85%, ≦80%, ≦75%, ≦70%, ≦65%, ≦60%, ≦55%, ≦50%, ≦45%, ≦40%, ≦35% or ≦30% of said first area.

56. An ion detector as claimed in claim 54, wherein said second area is ≦25%, ≦20%, ≦15% or ≦10% of said first area.

57. An ion detector as claimed in claim 54, wherein said second area is ≧10%, ≧15%, ≧20% or ≧25%, of said first area.

58. An ion detector as claimed in claim 54, wherein said second area is ≧30%, ≧35%, ≧40%, ≧45%, ≧50%, ≧55%, ≧60%, ≧65%, ≧70%, ≧75%, ≧80% or ≧85%.

59. An ion detector as claimed in claim 53, wherein said anode comprises a pin anode.

60. An ion detector for use in a mass spectrometer, said ion detector comprising:

one or more microchannel plates, wherein in use ions are received at an input surface of said one or more microchannel plates and electrons are released from an output surface of said one or more microchannel plates, said output surface having a first area; and an anode having a surface upon which electrons are received in use, wherein the surface of said anode has a second area;

wherein said second area is 5–25% of said first area.

61. An ion detector as claimed in claim 60, wherein said second area is ≦20%, ≦15% or ≦10% of said first area.

62. An ion detector for use in a mass spectrometer, said ion detector comprising:

one or more microchannel plates, wherein in use ions are received at an input surface of said one or more microchannel plates and electrons are released from an output surface of said one or more microchannel plates, said output surface having a first area; and an anode having a surface upon which electrons are received in use, wherein the surface of said anode has a second area;

wherein said second area is 30–90% of said first area.

63. An ion detector as claimed in claim 62, wherein said second area is ≧30%, ≧35%, ≧40%, ≧45%, ≧50%, ≧55%, ≧60%, ≧65%, ≧70%, ≧75%, ≧80% or ≧85% of said first area.

64. An ion detector as claimed in claim 60, wherein said surface of said anode is arranged a distance x mm from said output surface and wherein x is selected from the group consisting of: (i) <5 mm; (ii) 5–10 mm; (iii) 10–15 mm (iv) 15–20 mm; (v) 20–25 mm; and (vi) 25–30 mm.

65. ion detector as claimed in claim 60, wherein said surface of said anode is arranged a distance x mm from said output surface and wherein x is selected from the group consisting of: (i) 35–40 mm; (ii) 40–45 mm; (iii) 45–50 mm; (iv) 50–55 mm; (v) 55–60 mm; (vi) 60–65 mm; (vii) 65–70 mm; (viii) 70–75 mm; and (ix) >75 mm.

66. An ion detector as claimed in claim 1, wherein electrons may be received across substantially the whole of said second area.

67. An ion detector as claimed in claim 1, wherein said anode comprises a first portion, a second portion and an electrically insulating layer provided between said first and second portions, said first portion having a surface upon which electrons are received in use.

68. An ion detector as claimed in claim 67, wherein in use said first portion is maintained at a different DC potential to said second portion.

69. An ion detector as claimed in claim 67, wherein in use said first portion is maintained at substantially the same DC potential as said second portion.

70. An ion detector as claimed in claim 1, wherein said anode is substantially conical.

71. An ion detector as claimed in claim 70, further comprising a substantially conical screen surrounding at least a portion of said anode.

72. An ion detector as claimed in claim 1, wherein said anode has a capacitance selected from the group consisting of: (i) 0.01–0.1 pF; (ii) 0.1–1 pF; (iii) 1–10 pF; and (iv) 10–100 pF.

73. An ion detector as claimed in claim 1, wherein said surface of said anode upon which electrons are received in use is substantially flat.

74. An mass spectrometer comprising an ion detector as claimed in claim 1.

75. An mass spectrometer as claimed in claim 74, wherein said ion detector is arranged in a Time of Flight mass analyser.

76. An mass spectrometer as claimed in claim 75, wherein said Time of Flight mass analyser comprises an axial Time of Flight mass analyser.

77. An mass spectrometer as claimed in claim 75, wherein said Time of Flight mass analyser comprises an orthogonal acceleration Time of Flight mass analyser.

78. An mass spectrometer as claimed in claim 75, wherein said Time of Flight mass analyser further comprises a reflectron.

79. An mass spectrometer as claimed claim 74, further comprising an Analogue to Digital Converter ("ADC") connected to said ion detector.

80. An mass spectrometer as claimed in claim 74, further comprising a Time to Digital Converter ("TDC") connected to said ion detector.

81. An mass spectrometer as claimed in claim 74, further comprising an ion source selected from the group consisting of: (i) an Atmospheric Pressure Chemical lionization ("APCI") ion source; (ii) an Atmospheric Pressure Photo lionization ("APPI") ion source; (iii) a Laser Desorption lionization ("LDI") ion source; (iv) an Inductively Coupled Plasma ("ICP") ion source; (v) a Fast Atom Bombardment ("FAB") ion source; (vi) a Liquid Secondary Ion Mass Spectrometry ("LSIMS") ion source; (vii) a Field lionization ("FI") ion source; (viii) a Field Desorption ("FD") ion source; (ix) an Electron Impact ("EI") ion source; and (x) a Chemical lionization ("CI") ion source.

82. An mass spectrometer as claimed in claim 74, further comprising a Matrix Assisted Laser Desorption lionization ("MALDI") ion source.

83. An mass spectrometer as claimed in claim 74, further comprising an Electrospray ion source.

84. An mass spectrometer as claimed in claim 81, wherein said ion source is continuous.

85. An mass spectrometer as claimed in claim 81, wherein said ion source is pulsed.

86. An method of detecting ions comprising:
- receiving ions at an input surface of one or more microchannel plates;
- releasing electrons from an output surface of said one or more microchannel plates; and
- directing, guiding or attracting at least some of said electrons released from said one or more microchannel plates onto a surface of an anode by means of one or more electrodes and/or one or more magnetic lenses, wherein the area of said surface of said anode is ≧5% of the area of said output surface of said one or more microchannel plates.

87. An method of detecting ions comprising:
- receiving ions at an input surface of one or more microchannel plates;
- releasing electrons from an output surface of said one or more microchannel plates; and
- directing or guiding at least some of said electrons released from said one or more microchannel plates onto a surface of an anode by means of one or more electro-magnets and/or one or more permanent magnets.

88. An method of detecting ions comprising:
- receiving ions at an input surface of one or more microchannel plates;
- releasing electrons from an output surface of said one or more microchannel plates;
- directing, guiding or attracting at least some of said electrons released from said one or more microchannel plates onto a surface of an anode by means of a plurality of electrodes and/or one or more magnetic lenses.

89. An method of detecting ions comprising:
- receiving ions at an input surface of one or more microchannel plates;
- releasing electrons from an output surface of said one or more microchannel plates; and
- directing at least some of said electrons released from said one or more microchannel plates onto a surface of an anode, wherein said surface of said anode is arranged a distance x mm from said output surface and wherein x is selected from the group consisting of: (i) 35–40 mm; (ii) 40–45 mm; (iii) 45–50 mm; (iv) 50–55 mm; (v) 55–60 mm; (vi) 60–65 mm; (vii) 65–70 mm; (viii) 70–75 mm; and (ix) >75 mm.

90. An method of detecting ions comprising:
- receiving ions at an input surface of one or more microchannel plates;
- releasing electrons from an output surface of said one or more microchannel plates; and
- directing at least some of said electrons released from said one or more microchannel plates onto a surface of an anode, wherein the area of said surface of said anode is 5–25% of the area of said output surface of said one or more microchannel plates.

91. An method of detecting ions comprising:
- receiving ions at an input surface of one or more microchannel plates;
- releasing electrons from an output surface of said one or more microchannel plates; and
- directing at least some of said electrons released from said one or more microchannel plates onto a surface of an anode, wherein the area of said surface of said anode is 30–90% of the area of said output surface of said one or more microchannel plates.

92. An method of mass spectrometry comprising a method of detecting ions as claimed in claim 86.

* * * * *

UNITED STATES PATENT AND TRADEMARK OFFICE

CERTIFICATE OF CORRECTION

PATENT NO. : 7,157,697 B2
APPLICATION NO. : 10/734055
DATED : January 2, 2007
INVENTOR(S) : Robert Harold Bateman, Jeff Brown and Daniel James Kenny It is certified that error appears in the above-identified patent and that said Letters Patent is hereby corrected as shown below:

Title Page; item (75);
On the cover sheet, the surname "Kenney" of the third listed inventor should be spelled -- Kenny --.

Signed and Sealed this

Eighth Day of April, 2008

JON W. DUDAS
*Director of the United States Patent and Trademark Office*